(12) United States Patent
Kodaira et al.

(10) Patent No.: US 9,783,455 B2
(45) Date of Patent: *Oct. 10, 2017

(54) LIQUID COMPOSITION AND GLASS ARTICLE

(71) Applicant: Asahi Glass Company, Limited, Tokyo (JP)

(72) Inventors: Hirokazu Kodaira, Tokyo (JP); Yutaka Hayami, Tokyo (JP); Takashige Yoneda, Tokyo (JP)

(73) Assignee: ASAHI GLASS COMPANY, LIMITED, Tokyo (JP)

( * ) Notice: Subject to any disclaimer, the term of this patent is extended or adjusted under 35 U.S.C. 154(b) by 273 days.

This patent is subject to a terminal disclaimer.

(21) Appl. No.: 14/659,945

(22) Filed: Mar. 17, 2015

(65) Prior Publication Data
US 2015/0183683 A1    Jul. 2, 2015

Related U.S. Application Data

(63) Continuation of application No. PCT/JP2013/073536, filed on Sep. 2, 2013.

(30) Foreign Application Priority Data

Sep. 24, 2012 (JP) .................. 2012-209465

(51) Int. Cl.
| | |
|---|---|
| *C03C 17/28* | (2006.01) |
| *G02B 5/22* | (2006.01) |
| *C09D 5/32* | (2006.01) |
| *C03C 17/32* | (2006.01) |
| *B32B 15/01* | (2006.01) |
| *C09D 7/12* | (2006.01) |
| *C09D 133/08* | (2006.01) |
| *C09D 133/10* | (2006.01) |
| *C09D 135/00* | (2006.01) |
| *C09D 163/00* | (2006.01) |
| *C09D 201/00* | (2006.01) |
| *C09D 1/00* | (2006.01) |
| *C03C 17/00* | (2006.01) |
| *C08K 3/00* | (2006.01) |
| *C08K 5/00* | (2006.01) |
| *F21V 9/06* | (2006.01) |

(Continued)

(52) U.S. Cl.
CPC ............ *C03C 17/324* (2013.01); *B32B 15/01* (2013.01); *C03C 17/009* (2013.01); *C03C 17/28* (2013.01); *C08K 3/00* (2013.01); *C08K 5/00* (2013.01); *C09D 1/00* (2013.01); *C09D 5/32* (2013.01); *C09D 7/12* (2013.01); *C09D 7/1241* (2013.01); *C09D 133/08* (2013.01); *C09D 133/10* (2013.01); *C09D 135/00* (2013.01); *C09D 163/00* (2013.01); *C09D 201/00* (2013.01); *C03C 2217/29* (2013.01); *C03C 2217/475* (2013.01); *C03C 2217/476* (2013.01); *C03C 2217/48* (2013.01); *C03C 2217/74* (2013.01); *C08K 3/22* (2013.01); *C08K 5/07* (2013.01); *C08K 9/02* (2013.01); *C08K 2003/2231* (2013.01); *C08K 2003/2258* (2013.01); *Y10T 428/265* (2015.01)

(58) Field of Classification Search
CPC ..... C03C 17/28; C03C 17/324; C03C 17/326; C03C 2217/29; C09D 5/32; C09D 183/06; F21V 9/06; G02B 5/22; G02B 5/223
USPC ...... 106/287.18, 287.19; 252/587, 588, 589; 359/361; 428/336, 417, 426, 428, 429, 428/432; 524/114, 588
See application file for complete search history.

(56) References Cited

U.S. PATENT DOCUMENTS

| | | | | |
|---|---|---|---|---|
| 2012/0038976 A1* | 2/2012 | Kodaira | ................. | C03C 17/30 359/361 |
| 2013/0071669 A1* | 3/2013 | Kodaira | ................. | C03C 17/008 428/429 |
| 2014/0023860 A1* | 1/2014 | Kodaira | ................. | C03C 17/326 428/336 |

FOREIGN PATENT DOCUMENTS

| | | |
|---|---|---|
| EP | 1 283 270 A1 | 3/2003 |
| EP | 1 757 566 A1 | 2/2007 |

(Continued)

OTHER PUBLICATIONS

International Preliminary Report on Patentability and Written Opinion dated Apr. 2, 2015 in PCT/JP2013/073536 (submitting English language translation only).

(Continued)

*Primary Examiner* — Bijan Ahvazi
(74) *Attorney, Agent, or Firm* — Oblon, McClelland, Maier & Neustadt, L.L.P.

(57) ABSTRACT

There are provided a liquid composition capable of forming a coating film securing colorless transparency, being excellent in weather resistance, suppressing occurrence of bleedout, and having sufficiently ultraviolet absorbing function and the infrared absorbing function, and a glass article having a coating film formed by this composition. A liquid composition for forming a coating film contains an infrared absorbent selected from a tin-doped indium oxide, an antimony-doped tin oxide, and a composite tungsten oxide; an ultraviolet absorbent selected from a benzophenone-based compound, a triazine-based compound, and a benzotriazole-based compound; predetermined amount of a dispersing agent having a molecular weight of 1,000 to 100,000; predetermined amount of a chelating agent relative forming a complex with the infrared absorbent and having a molecular weight of 1,000 to 100,000, the complex exhibiting substantially no absorption with respect to light having a visible wavelength; a binder component; and a liquid medium.

10 Claims, No Drawings

(51) Int. Cl.
  *C09D 183/06* (2006.01)
  *C08K 3/22* (2006.01)
  *C08K 5/07* (2006.01)
  *C08K 9/02* (2006.01)

(56) References Cited

FOREIGN PATENT DOCUMENTS

| | | |
|---|---|---|
| EP | 2 431 433 A1 | 3/2012 |
| EP | 2 690 145 A1 | 1/2014 |
| JP | 2006-51608 A | 2/2006 |
| JP | 2008-101111 | 5/2008 |
| WO | WO 2010/131744 A1 | 11/2010 |
| WO | WO 2011/142463 A1 | 11/2011 |

OTHER PUBLICATIONS

International Search Report issued in International Application No. PCT/JP2013/073536, dated Nov. 26, 2013.
Extended European Search Report dated Mar. 1, 2016 in European Patent Application No. 13839404.4.
U.S. Appl. No. 14/926,571, filed Oct. 29, 2015, Kodaira, et al.

* cited by examiner

LIQUID COMPOSITION AND GLASS ARTICLE

CROSS-REFERENCE TO RELATED APPLICATIONS

This application is a continuation of prior International Application No. PCT/JP2013/073536, filed on Sep. 2, 2013 which is based upon and claims the benefit of priority from Japanese Patent Application No. 2012-209465 filed on Sep. 24, 2012; the entire contents of all of which are incorporated herein by reference.

FIELD

The present invention relates to a liquid composition for forming an ultraviolet and infrared absorbing film blocking both ultraviolet rays and infrared rays on a surface of an article of glass, or the like and a glass article having an ultraviolet and infrared absorbing film formed by using the liquid composition.

BACKGROUND

In recent years, attempts have been made to form, on a transparent substrate such as a window glass for vehicle such as an automobile, a window glass for a building material to be attached to an architecture, such as a house or a building, and the like, an ultraviolet absorbing film having an ability to absorb ultraviolet rays which enter a vehicle or a building through these substrates, and having mechanical durability such as abrasion resistance. On the other hand, attempts have been made to form an infrared absorbing film having an infrared absorbing function on a transparent substrate such as a glass.

Moreover, there have been invented coating liquids for forming a coating film having both these ultraviolet absorbing function and infrared absorbing function on a transparent substrate such as a glass, as well as substrates on which such a coating film is formed (see Patent Reference 1 (JP-A 2008-101111)).

Specifically, in the coating film described in Patent Reference 1, a benzophenone-based and/or benzotriazole-based organic compound is used as an ultraviolet absorbent, and inorganic particles of composite tungsten oxide, antimony-doped tin oxide, tin-doped indium oxide, or the like are used as an infrared absorbent. Thus, the coating film having both these ultraviolet absorbing function and infrared absorbing function can be obtained.

SUMMARY

The present inventors have found that when the ultraviolet absorbent (benzophenone-based and/or benzotriazole-based organic compound) and the infrared absorbent (inorganic particles of composite tungsten oxide, antimony-doped tin oxide, tin-doped indium oxide, or the like) exist in the same film as in the coating film described in Patent Reference 1, there are problems in that the organic compound undergoes chelate bonding with the inorganic particles, which causes absorption in the visible light range resulting in a yellowish color in the film even when colorless transparency is required, and in weather resistance.

As a method to solve them, it is conceivable to prevent chelate bonding of the organic compound with the inorganic particles by blending a dispersing agent and/or chelating agent in a composition for forming a coating film. However, there has been a concern that a bleedout occurs depending on the type and amount of the dispersing agent and/or the chelating agent.

The present invention has been made to solve the above problems, and it is an object thereof to provide a liquid composition capable of forming a coating film which secures colorless transparency and is further excellent in weather resistance, and in which occurrence of bleedout is suppressed even though it sufficiently has the ultraviolet absorbing function and the infrared absorbing function, and a glass article having a coating film which securely has colorless transparency and is further excellent in weather resistance, and in which occurrence of bleedout is suppressed even though it sufficiently has the ultraviolet absorbing function and the infrared absorbing function.

The present invention provides liquid compositions and glass articles of following [1] to [10].

[1] A liquid composition for forming a coating film, the liquid composition containing:
an infrared absorbent (a) containing one or more oxides selected from a tin-doped indium oxide, an antimony-doped tin oxide, and a composite tungsten oxide;
an ultraviolet absorbent (b) containing one or more compounds selected from a benzophenone-based compound, a triazine-based compound, and a benzotriazole-based compound;
5 to 15 parts by mass of a dispersing agent (c) relative to 100 parts by mass of the infrared absorbent (a), the dispersing agent having a molecular weight of 1,000 to 100,000;
1 to 13 parts by mass of a chelating agent (d) relative to 100 parts by mass of the infrared absorbent (a), the chelating agent being capable of forming a complex with the infrared absorbent (a) and having a molecular weight of 1,000 to 100,000, the formed complex exhibiting substantially no absorption with respect to light having a visible wavelength;
a binder component (e); and
a liquid medium (f).

[2] The liquid composition according to [1], containing the infrared absorbent (a) in a ratio of 1 to 80 parts by mass and the ultraviolet absorbent (b) in a ratio of 1 to 50 parts by mass, relative to 100 parts by mass of the binder component (e).

[3] The liquid composition according to [1], containing a hydroxylated benzophenone-based compound as the ultraviolet absorbent (b).

[4] The liquid composition according to [1], containing, as the ultraviolet absorbent (b), one or more compounds selected from a benzophenone-based compound, a triazine-based compound and a benzotriazole-based compound which contain a silyl group having a hydrolyzable group.

[5] The liquid composition according to [1], wherein the infrared absorbent (a) is a tin-doped indium oxide.

[6] The liquid composition according to [1], wherein the chelating agent (d) is a polymer constituted of one or more monomers selected from a maleic acid, an acrylic acid, and a methacrylic acid.

[7] The liquid composition according to [1], wherein the binder component (e) is mainly constituted of a material component for forming silicon oxide-based matrix.

[8] The liquid composition according to [7], wherein the binder component (e) further contains polyepoxides.

[9] A glass article, having a glass substrate and a coating film formed on a surface of at least a part of the glass substrate by using the liquid composition according to [1].

[10] The glass article according to [9], wherein a film thickness of the coating film is 1.0 μm to 7.0 μm.

By a liquid composition of the present invention, it is possible to form a coating film which secures colorless transparency and is further excellent in weather resistance, and in which occurrence of bleedout is suppressed, even though it sufficiently has the ultraviolet absorbing function and the infrared absorbing function. Further, a glass article of the present invention having a coating film formed by the liquid composition of the present invention is a glass article which securely has colorless transparency and weather resistance, and in which occurrence of bleedout is further suppressed, even though it sufficiently has the ultraviolet absorbing function and the infrared absorbing function.

DETAILED DESCRIPTION

Embodiments of the present invention will be described below.

[Liquid Composition of the Present Invention]

A liquid composition of the present invention is a liquid composition for forming a coating film, the liquid composition containing: an infrared absorbent (a) containing one or more oxides selected from a tin-doped indium oxide, an antimony-doped tin oxide, and a composite tungsten oxide; an ultraviolet absorbent (b) containing one or more compounds selected from a benzophenone-based compound, a triazine-based compound, and a benzotriazole-based compound; 5 to 15 parts by mass of a dispersing agent (c) relative to 100 parts by mass of the infrared absorbent (a), the dispersing agent having a molecular weight of 1,000 to 100,000; 1 to 13 parts by mass of a chelating agent (d) relative to 100 parts by mass of the infrared absorbent (a), the chelating agent being capable of forming a complex with the infrared absorbent (a) and having a molecular weight of 1,000 to 100,000, the formed complex exhibiting substantially no absorption with respect to light having a visible wavelength; a binder component (e); and a liquid medium (f). Note that in this description, the above components may also be described only by a reference symbol, for example, the infrared absorbent (a) as component (a).

The components will be described below.

(Infrared Absorbent (a))

The liquid composition of the present invention contains, in order to give an infrared absorbing function to a coating film formed by using this liquid composition, an infrared absorbent (a) containing one or more oxides selected from a composite tungsten oxide, an antimony-doped tin oxide (ATO), and a tin-doped indium oxide (ITO). Note that in the present invention, these infrared absorbents (a) are used in the form of particles.

As the composite tungsten oxide, specifically, a composite tungsten oxide represented by a general formula: $M_xW_yO_z$ (where element M is one or more elements selected from Cs, Rb, K, Tl, In, Ba, Li, Ca, Sr, Fe, and Sn, W is tungsten, O is oxygen, $0.001 \leq x/y \leq 1$, and $2.2 \leq z/y \leq 3.0$) may be mentioned. The composite tungsten oxide represented by the above general formula effectively functions as the infrared absorbent because a sufficient amount of free electrons is generated therein.

Note that particles of the composite tungsten oxide represented by the above general formula: $M_xW_yO_z$ excel in durability when they have a hexagonal, a tetragonal, or a cubic crystal structure, and thus they preferably contain one or more crystal structures selected from the hexagonal, tetragonal, and cubic crystal structures. In such a crystal structure, the amount (x) of elements M to be added is 0.001 or more and 1.0 or less by a value of x/y, which is a mole ratio with the amount (y) of tungsten, and the amount (z) of existing oxygen is 2.2 or more and 3.0 or less by a value of z/y, which is a mole ratio with the amount (y) of tungsten.

Moreover, preferably, the value of x/y is approximately 0.33. This is because the value of x/y calculated theoretically from the hexagonal crystal structure is 0.33, and containing the element M by an amount that makes the value of x/y be about this value enables the composite tungsten oxide particles to exhibit preferred optical properties. As such composite tungsten oxides, specifically, $Cs_{0.33}WO_3$, $Rb_{0.33}WO_3$, $K_{0.33}WO_3$, and $Ba_{0.33}WO_3$ may be mentioned. However, the composite tungsten oxide used in the present invention is not limited thereto, and has a useful infrared absorbing property as long as the values of x/y and z/y are within the above ranges.

Such a composite tungsten oxide is an infrared absorbent known to have a maximum value of transmittance between wavelengths of 400 nm to 700 nm, and a minimum value thereof between wavelengths of 700 nm to 1800 nm in a film in which particles thereof are dispersed evenly.

The particles of the composite tungsten oxide represented by the above general formula: $M_xW_yO_z$ can be produced by a conventional publicly known method. For example, a tungsten compound starting material obtained by mixing an ammonium tungstate aqueous solution or a tungsten hexachloride solution with an aqueous solution of a chloride salt, a nitrate, a sulfate, an oxalate, an oxide, or the like of element M in a predetermined ratio is used, and is heat treated in an inert gas atmosphere or a reduced gas atmosphere, thereby obtaining the composite tungsten oxide particles.

Note that a surface of the composite tungsten oxide particles is preferably covered with an oxide of a metal selected from Si, Ti, Zr, Al, and the like from the viewpoint of improving weather resistance. The method of covering is not particularly limited, and it is possible to cover the surface of the composite tungsten oxide particles by adding an alkoxide of the above metal to a solution in which the composite tungsten oxide particles are dispersed.

As the above ATO particles and ITO particles, it is possible to use without any particular limitation particles prepared by various conventional publicly known preparation methods, for example, a physical method for obtaining the particles by pulverizing metal powder by a mechano-chemical method or the like; a chemical dry method such as CVD, vapor deposition, sputtering, thermal plasma method, or laser method; a method called a chemical wet method by thermal decomposition, chemical reduction, electrolysis, supersonic method, laser abrasion, supercritical fluid method, microwave synthesis, or the like.

Further, the crystal structures of these particles are not limited to an ordinary cubic structure, and depending on the type of binder component (e) which will be described later, for example, a hexagonal ITO with relatively low infrared absorptivity can be used as necessary.

The above composite tungsten oxide particles, the ATO particles, and the ITO particles may be used alone as the infrared absorbent (a), or two or more of them may be used in a mixture. In the present invention, the ITO particles are preferably used in view of transmittance loss and environmental safety. In the present invention, moreover, infrared-absorbing particles other than them may be used as the infrared absorbent (a) in combination with at least one selected from the composite tungsten oxide particles, ATO particles, and ITO particles as necessary within a range not impairing the effects of the present invention.

A mean primary particle diameter of particles of the infrared absorbent (a) is preferably 100 nm or less, more preferably 50 nm or less, particularly preferably 30 nm or less.

When the mean primary particle diameter is 100 nm or less, the tendency of aggregation of particles together in a liquid composition containing them does not increase, and precipitation of the particles can be avoided. Further, when a coating film is formed by a liquid composition containing them, occurrence of haze due to scattering (increase in haze) can be suppressed, and thus the above-described particle diameter is preferred in view of maintaining transparency. Note that the lower limit of the mean primary particle diameter is not particularly limited, and it is possible to use the infrared absorbent (a) particles of approximately 2 nm which can be produced by the current technology. Here, the mean primary particle diameter of particles refers to a diameter measured from an image observed with a transmission electron microscope.

The content of the infrared absorbent (a) in the liquid composition of the present invention is preferably 1 to 80 parts by mass, more preferably 5 to 60 parts by mass, particularly preferably 5 to 40 parts by mass relative to 100 parts by mass of the binder component (e), from the points that the coating film formed by using this has sufficient infrared absorptivity, and mechanical strength of the coating film is secured.

Note that regarding the inorganic particles used as the infrared absorbent (a) in the present invention, from the viewpoint of securing sufficient dispersibility in the obtained liquid composition, preferably, a dispersion liquid in which the inorganic particles are dispersed in a dispersion medium is prepared in advance, and the inorganic particles are blended in the liquid composition for forming a coating film in the state of this dispersion liquid. The aggregation state of the infrared absorbent (a) particles in the coating film to be formed reflects the aggregation state in the liquid composition or even in a material dispersion liquid. Thus, in order to maintain transparency of the coating film, the particles of the infrared absorbent (a) are preferably highly dispersed in the dispersion liquid. From the viewpoint of this dispersibility, when the dispersion liquid of the infrared absorbent (a) is prepared, a dispersing agent (c), which will be described later, is preferably blended in this dispersion liquid, and then blended as they are in the liquid composition.

The infrared absorbent (a) is thought to exhibit a yellowish color when undergoing chelate bonding with an ultraviolet absorbent (b), and it is necessary to suppress this. In the liquid composition of the present invention, by using the dispersing agent (c) and a chelating agent (d), the dispersibility of the infrared absorbent (a) particles is secured, and moreover, chelate bonding between the infrared absorbent (a) particles and the ultraviolet absorbent (b) is suppressed.

Here, as described above, the dispersion medium in the dispersion liquid of the infrared absorbent (a) particles consequently constitutes, in the obtained liquid composition, a part of a liquid medium (f) contained in this composition. Thus, preferably, a compound similar to the liquid medium (f), which will be described later, or having compatibility therewith is used as the dispersion medium.

(Ultraviolet Absorbent (b))

The liquid composition of the present invention contains, in order to add an ultraviolet absorbing function to the coating film formed using this liquid composition, the ultraviolet absorbent (b) containing one or more compounds selected from a benzophenone-based compound, a triazine-based compound, and a benzotriazole-based compound.

As the benzotriazole-based ultraviolet absorbent, specifically, there may be mentioned 2-[5-chloro(2H)-benzotriazole-2-yl]-4-methyl-6-(tert-butyl) phenol (as a commercial product, TINUVIN 326 (product name, made by Ciba Japan), or the like)), octyl-3-[3-tert-4-hydroxy-5-[5-chloro-2H-benzotriazole-2-yl]propionate, 2-(2H-benzotriazole-2-yl)-4,6-di-tert-pentylphenol, 2-(2-hydroxy-5-methylphenyl)benzotriazole, 2-[2-hydroxy-3-(3,4,5,6-tetrahydrophthalimide-methyl)-5-methylphenyl]benzotriazole, 2-(2-hydroxy-5-tert-octylphenyl)benzotriazole, 2-(2-hydroxy-5-tert-butylphenyl)-2H-benzotriazole, methyl 3-(3-(2H-benzotriazole-2-yl)-5-tert-butyl-4-hydroxyphenyl)propionate, 2-(2H-benzotriazol-2-yl)-4,6-bis(1-methyl-1-phenylethyl)phenol, 2-(2H-benzotriazole-2-yl)-6-(1-methyl-1-phenylethyl)-4-(1,1,3,3-tetramethylbutyl)phenol, and the like. Among them, preferably, 2-[5-chloro(2H)-benzotriazole-2-yl]-4-methyl-6-(tert-butyl) phenol is used.

As the triazine-based ultraviolet absorbent, specifically, there may be mentioned 2-[4-[(2-hydroxy-3-dodecyloxypropyl)oxy]-2-hydroxyphenyl]-4,6-bis(2,4-dimethylphenyl)-1,3,5-triazine, 2-[4-[(2-hydroxy-3-(2'-ethyphexyl)oxy]-2-hydroxyphenyl]-4,6-bis(2,4-dimethylphenyl)-1,3,5-triazine, 2,4-bis(2-hydroxy-4-butoxyphenyl)-6-(2,4-bis-butoxyphenyl)-1,3,5-triazine, 2-(2-hydroxy-4-[1-octylcarbonylethoxy]phenyl)-4,6-bis(4-phenylphenyl)-1,3,5-triazine, TINUVIN 477 (product name, made by Ciba Japan), and the like. Among them, preferably, the 2-(2-hydroxy-4-[1-octylcarbonylethoxy]phenyl)-4,6-bis(4-phenylphenyl)-1,3,5-triazine is used.

As the benzophenone-based ultraviolet absorbent, specifically, there may be mentioned 2,4-dihydroxybenzophenone, 2,2',3(or one of 4,5,6)-trihydroxybenzophenone, 2,2',4,4'-tetrahydroxybenzophenone, 2,4-dihydroxy-2',4'-dimethoxybenzophenone, 2-hydroxy-4-n-octoxybenzophenone, and the like. Among them, preferably, 2,2',4,4'-tetrahydroxybenzophenone is used.

The maximum absorption wavelength of light of these exemplified organic-based ultraviolet absorbents is within the range of 325 nm to 425 nm, and are within the range of about 325 nm to 390 nm in many cases. Organic-based ultraviolet absorbents thus having absorptivity with respect to ultraviolet rays with a relatively long wavelength are used preferably for their characteristics. These organic-based ultraviolet absorbents are thought to easily undergo chelate bonding with the inorganic particles constituting the infrared absorbent (a) due to having a phenolic hydroxyl group and exhibit a yellowish color. In the liquid composition of the present invention, containing the dispersing agent (c) and the chelating agent (d), which will be described later, enables to suppress the chelate bonding and prevent exhibition of yellowish color while maintaining the ultraviolet absorptivity.

Therefore, the effects which the liquid composition of the present invention has are more significant when the ultraviolet absorbent (b) is used, which has absorption in a long-wavelength region of ultraviolet and has a phenolic hydroxyl group which easily undergoes chelate bonding with the inorganic particles constituting the infrared absorbent (a).

In the present invention, one of these ultraviolet absorbents can be used alone, or two or more of them can be used in combination. Further, among these ultraviolet absorbents, in the liquid composition of the present invention, the hydroxylated benzophenone-based ultraviolet absorbent is used preferably among the above exemplified ultraviolet absorbents since its solubility to solvent is high and its absorption wavelength band is in a desired range. In the present invention, moreover, an ultraviolet-absorbing material other than them may be used as the ultraviolet absorbent (b) in combination with at least one compound selected from the benzophenone-based compound, the triazine-based compound, and the benzotriazole-based compound as necessary within a range not impairing the effects of the present invention.

In the present invention, as these ultraviolet absorbents (b), an ultraviolet absorbent which is not soluble or has low solubility to the liquid medium (f), which will be described later, can also be used. In this case, preferably, the ultraviolet absorbent (b) is dispersed as particles in a dispersion medium to prepare a dispersion liquid, and this dispersion liquid is contained in the liquid composition. Further, in order to improve dispersibility in a coating film of the particles of the ultraviolet absorbent (b), the dispersion liquid in which the particles of the ultraviolet absorbent (b) are dispersed is preferably a dispersion liquid in which they are dispersed using a dispersing agent.

Note that similarly to the dispersion liquid of the infrared absorbent (a) particles, the dispersion medium in the dispersion liquid of the ultraviolet absorbent (b) particles consequently constitutes, in the obtained liquid composition, a part of the liquid medium (f) contained in the composition, and thus preferably a compound similar to the liquid medium (f), which will be described later, or having compatibility therewith is used as the dispersion medium. Further, as the dispersing agent, preferably, a compound similar to the dispersing agent (c) is used. Note that the content ratio of the dispersing agent (c) in the liquid composition is calculated using the total amount of the dispersing agent (c) in these dispersion liquids used for preparing the liquid composition.

The content of the ultraviolet absorbent (b) in the liquid composition of the present invention is preferably 1 to 50 parts by mass, more preferably 5 to 40 parts by mass, particularly preferably 8 to 30 parts by mass relative to 100 parts by mass of the binder component (e), from the points that a coating film formed by using this has sufficient ultraviolet absorptivity, and mechanical strength of the coating film is secured.

Note that in the liquid composition of the present invention, in order to prevent bleedout of the ultraviolet absorbent (b) from the coating film obtained by using this, it is possible to constitute the ultraviolet absorbent (b) as follows as necessary. Specifically, when the binder component (e), which will be described later, has a reactive group, and a coating film is formed by reaction of them, a functional group having reactivity to the reactive group may be introduced into the ultraviolet absorbent (b) and used. Here, the compound used for this introduction is assumed as a part of the binder component (e) when the content of the ultraviolet absorbent (b) in the liquid composition is calculated.

For example, when the binder component (e) is mainly constituted of hydrolyzable silicon compounds which are a material component for forming silicon oxide-based matrix, at least one selected from the compounds containing a silyl group having a hydrolyzable group, which is obtained by introducing a silyl group having a hydrolyzable group by a respective appropriate method into the benzophenone-based compounds, the triazine-based compounds, and the benzotriazole-based compounds exemplified above, can be contained as the ultraviolet absorbent (b) in the liquid composition. Note that the ultraviolet absorbent constituted of the above compounds containing a silyl group having a hydrolyzable group will be hereinafter referred to as a silylated ultraviolet absorbent.

Specifically, it is possible to use as the ultraviolet absorbent (b) a reaction product (hereinafter also referred to as a "silylated benzophenone-based compound") of a hydroxylated benzophenone-based compound preferably used in the present invention and a hydrolyzable silicon compound containing a group having reactivity with a hydroxyl group, for example, an epoxy group. When the silylated benzophenone-based compound is contained in the liquid composition together with the hydrolyzable silicon compounds, they co-cross-link with each other by hydrolysis reaction to form a silicon oxide-based matrix. Thus, a hydroxylated benzophenone-based compound residue derived from the silylated benzophenone-based compound is fixed to the silicon oxide-based matrix, thereby preventing the bleedout. As a result, the coating film obtained can retain the ultraviolet absorptivity for a long period.

The silylated ultraviolet absorbent will be described below with an example of the silylated benzophenone-based compound.

As the benzophenone-based compound having a hydroxyl group as a material of the silylated benzophenone-based compound, a benzophenone-based compound having two to four hydroxyl groups represented by the following general formula (A) is preferably used from the point that it has excellent ultraviolet absorptivity after silylation. In particular, saying from the point of the absorptivity of ultraviolet rays with a long wavelength up to 380 nm, the number of hydroxyl groups which the hydroxylated benzophenone-based compound has is more preferably 3 or 4.

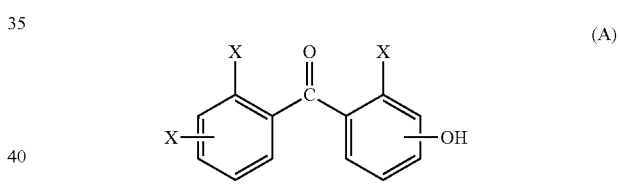

(A)

In the formula (A), X represents a hydrogen atom or a hydroxyl group which may be the same as or different from each other, and at least one of them is a hydroxyl group.

Moreover, among the benzophenone-based compounds having a hydroxyl group represented by the above general formula (A), in the present invention, 2,4-dihydroxybenzophenone, 2,2',3(or one of 4,5,6)-trihydroxybenzophenone, 2,2',4,4'-tetrahydroxybenzophenone, and the like are more preferred, and 2,2',4,4'-tetrahydroxybenzophenone is particularly preferred. In the reaction of silylating the benzophenone-based compound having a hydroxyl group, one of hydroxylated benzophenone-based compounds can be used alone, or a mixture of two or more of them can be used.

As a hydrolyzable silicon compound containing a group having reactivity to a hydroxyl group, particularly a hydrolyzable silicon compound containing an epoxy group, which is used for reaction to silylate such a hydroxylated benzophenone-based compound, a trifunctional or bifunctional hydrolyzable silicon compound may be mentioned, in which a non-hydrolyzable monovalent organic group having an epoxy group is bonded to a silicon atom. Preferably, 3-glycidoxypropyltrimethoxysilane, 3-glycidoxypropylmethyldimethoxysilane, 3-glycidoxypropyltriethoxysilane, 3-glycidoxypropylmethyldiethoxysilane, 2-(3,4-epoxycyclohexyl)ethyltrimethoxysilane, 2-(3,4- epoxycyclohexyl)ethylmethyldimethoxysilane, 2-(3,4-epoxycyclohexyl)ethyltriethoxysilane, and 2-(3,4-epoxycyclohexyl)ethylmethyldiethoxysilane, and the like may be mentioned.

Among them, in the present invention, from the viewpoint that solubility to the liquid composition can be increased, or the like, as the epoxidized hydrolyzable silicon compounds, particularly preferably, 3-glycidoxypropyltrimethoxysilane, 2-(3,4-epoxycyclohexyl)ethyltrimethoxysilane, 3-glycidoxypropylmethyldimethoxysilane, 2-(3,4-epoxycyclohexyl)ethylmethyldimethoxysilane, and the like are used. Note that in the reaction of silylating the hydroxylated benzophenone-based compound, one of the epoxidized hydrolyzable silicon compounds can be used alone, or a mixture of two or more of them can be used.

As the method for obtaining the reaction product of the hydroxylated benzophenone-based compound and the epoxidized hydrolyzable silicon compound, an ordinary method related to silylating reaction can be applied without being limited in particular. Specifically, the following method may be mentioned.

At least one of the hydroxylated benzophenone-based compounds and at least one of the epoxidized hydrolyzable silicon compounds are brought into reaction under existence of a catalyst as necessary. The amount of the epoxidized hydrolyzable silicon compound used in the reaction is not particularly limited, but is preferably 0.5 to 5.0 moles, more preferably 1.0 to 3.0 moles relative to 1 mole of the hydroxylated benzophenone-based compound. If the amount of the epoxidized hydrolyzable silicon compound relative to 1 mole of the hydroxylated benzophenone-based compound is less than 0.5, when it is added to the liquid composition for forming a coating film, bleedout may occur due to that a large amount of the hydroxylated benzophenone-based compound which is not silylated exists in the film. Further, it is also possible that mechanical durability as a coating film cannot be maintained. Further, when the amount of the epoxidized hydrolyzable silicon compound relative to 1 mole of the hydroxylated benzophenone-based compound exceeds 5.0 mole, the absolute quantity of the hydroxylated benzophenone-based compound related to ultraviolet absorption becomes small, and thus it is possible that the ultraviolet absorptivity decreases.

As the catalyst used for the silylating reaction, a quaternary ammonium salt as described in JP-A S58-10591 is preferred. As the quaternary ammonium salt, tetramethylammonium chloride, tetraethylammonium chloride, benzyltrimethylammonium chloride, benzyltriethylammonium chloride, and the like are exemplified.

The addition amount of the catalyst to the reaction system is not limited in particular, but is preferably an addition amount of 0.005 to 10 parts by mass, more preferably, an addition amount of 0.01 to 5 parts by mass relative to 100 parts by mass in total of the hydroxylated benzophenone-based compound and the epoxidized hydrolyzable silicon compound. When the addition amount of the catalyst relative to 100 parts by mass in total of the hydroxylated benzophenone-based compound and the epoxidized hydrolyzable silicon compound is less than 0.005 parts by mass, the reaction takes long time, or when it exceeds 10 parts by mass, it is possible that the catalyst lowers stability of the liquid composition when this reaction product is added to the liquid composition for forming a coating film.

The above silylating reaction can be carried out by heating a mixture of the hydroxylated benzophenone-based compound and the epoxidized hydrolyzable silicon compound in preferably the above ratio for 4 to 20 hours in the temperature range of 50° C. to 150° C. under existence of the catalyst. This reaction can be carried out without a solvent or carried out in a solvent in which both the hydroxylated benzophenone-based compound and the epoxidized hydrolyzable silicon compound are solved. However, a method to use the solvent is preferred for easiness of controlling the reaction and for easiness of handling. As such solvent, toluene, xylene, ethyl acetate, butyl acetate, and the like are exemplified. Further, as the amount of the solvent used, an amount of about 10 to 300 parts by mass relative to 100 parts by mass in total of the hydroxylated benzophenone-based compound and the epoxidized hydrolyzable silicon compound may be mentioned.

As the silylated benzophenone-based compound used preferably in the present invention, a reaction product obtained by reaction of one or two hydroxyl groups of the benzophenone-based compound containing three or more hydroxyl groups with the epoxy group of the epoxidized hydrolyzable silicon compound, and the like may be mentioned. More preferably, 4-(2-hydroxy-3-(3-trimethoxysilyl)propoxy)propoxy)-2,2'4'-trihydroxybemophenone, or the like, represented by the following formula (B) may be mentioned. Note that Me in the following formula (B) represents a methyl group.

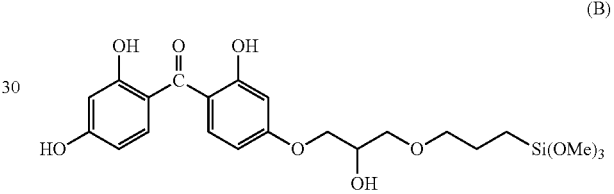

(B)

Note that in the liquid composition of the present invention, when the binder (e) component is mainly constituted of the material component for forming silicon oxide-based matrix, and when the silylated benzophenone-based compound is contained as the ultraviolet absorbent (b), the content of the silylated benzophenone-based compound may be adjusted so that the amount of hydroxylated benzophenone-based compound residue in the silylated benzophenone-based compound becomes the content of the ultraviolet absorbent in the liquid composition described above. Further, a portion other than the hydroxylated benzophenone-based compound residue of the silylated benzophenone-based compound is treated as the material component for forming silicon oxide-based matrix in the binder (e) component.

(Dispersing Agent (c))

The liquid composition of the present invention contains the dispersing agent (c) having a molecular weight of 1,000 to 100,000 to be a ratio of 5 to 15 parts by mass relative to 100 parts by mass of the infrared absorbent (a).

The dispersing agent (c) is a component used for the purpose of dispersing the respective particles constituting the infrared absorbent (a) with dispersion stability in the liquid composition. Further, the dispersing agent (c) has an operation to suppress chelate bonding between the particles constituting the infrared absorbent (a) and the ultraviolet absorbent (b) which exist together in the liquid composition. Note that in the liquid composition of the present invention, the effect to suppress the chelate bonding cannot be said as sufficient when the dispersing agent (c) is used alone, but can be sufficient when used in combination with the chelating agent (d), which will be described later.

Here, in the present specification, the dispersing agent (c) generally refers to compounds having a function to increase dispersion stability of particles in the infrared absorbent (a) by having, at least in a molecule, a portion which adheres to the surface of a particle constituting the infrared absorbent (a) and a portion which, after adhering to the particle, extends from the portion adhering to the particle into the dispersion medium (to be a part of the liquid medium (f)), allowing stable dispersion of the particles in the liquid composition by repulsion of charges or by a steric hinderance which themselves have. The dispersing agent (c) and the chelating agent (d), which will be described later, differ in not having the function to increase the dispersion stability, though the chelating agent (d) adheres to the particles of the infrared absorbent (a).

The molecular weight of the dispersing agent (c) is 1,000 to 100,000, preferably 1,500 to 100,000, more preferably 2,000 to 100,000. Note that the molecular weight of the dispersing agent (c) is a weight average molecular weight measured by gel permeation chromatography (GPC). In this description, unless particularly stated otherwise, the molecular weight is a weight average molecular weight measured by gel permeation chromatography (GPC).

The dispersing agent (c) is not limited in particular except the molecular weight, and when the respective particles constituting the infrared absorbent (a) are applied to the various liquid compositions for forming a coating film, among typically used dispersing agents, those with the above molecular weight among the dispersing agents can be used without any particular limitation. With the molecular weight of the dispersing agent (c) being in the above range, when a sufficient amount for highly dispersing the infrared absorbent (a) particles, specifically, 5 to 15 parts by mass relative to 100 parts by mass of the infrared absorbent (a) are used, the dispersing agent (c) does not bleed out from the coating film after the coating film is formed, and also adhering points do not decrease relative to molecules.

The content of the dispersing agent (c) in the liquid composition is in a ratio of 5 to 15 parts by mass, preferably 7 to 15 parts by mass, more preferably 10 to 12 parts by mass relative to 100 parts by mass of the infrared absorbent (a). The content of the dispersing agent (c) is an amount that does not cause bleedout of the dispersing agent (c) from a coating film after the coating film is formed, while sufficiently securing dispersibility of the infrared absorbent (a) particles in the liquid composition when the dispersing agent (c) with the above molecular weight is used.

The dispersing agent (c) may be an anion-based or cation-based dispersing agent which has an acid value or an amine value, that is, having a functional group having an acidic group or basic group or a salt thereof, and may be a nonionic dispersing agent with an acid value or amine value of zero. Note that the acid value is a mass (unit mg) of potassium hydroxide (KOH) needed for neutralizing 1 g of the compound, and the amine value is expressed by the number of mg of KOH corresponding to the acid value, obtained by neutralizing and titrating an amino group with an acid. In this description, the unit of acid value and amine value is described as mgKOH/g.

In the case of the anion-based or cation-based dispersing agent (c), preferably, the acid value and the amine value are each in the range of 5 to 100 mgKOH/g. Note that in the case of the dispersing agent (c) having both the acid value and the amine value, it is just necessary that the total value is in the above range.

As the dispersing agent (c), specifically, there may be mentioned a dispersing agent constituted of a high molecular copolymer with the above molecular weight either having or not having an acidic group, a basic group, or a substituent of them in the form of salt, among high molecular dispersing agents generally used for dispersing inorganic particles in various liquid compositions. As types of high molecular chains, for example, there may be mentioned urethane, polyimide, alkyd, epoxy, polyester, melamine, phenol, acrylic, polyether, vinyl chloride, vinyl chloride-vinyl acetate copolymer, polyamide, polycarbonate, styrene, and the like.

In the present invention, the type of the high molecular chain of the dispersing agent (c) used is appropriately selected based on the type of the binder component (e) in the liquid composition and the type of the liquid medium (f) normally used according to this binder component (e). For example, when the binder component (e) is mainly constituted of the material component for forming silicon oxide-based matrix, the liquid composition contains water and alcohol, and thus a high molecular dispersing agent containing a polyethyleneoxide group is particularly preferred among them. As the dispersing agent (c), use of a styrene base dispersing agent is also preferred.

As the dispersing agent (c), commercially available dispersing agents for inorganic particles can be used. Specifically, as the dispersing agent (c) having an acid value and/or an amine value, there may be mentioned DISPERBYK-190 (aqueous solution with a molecular weight: 2200, acid value: 10 mgKOH/g, and solid content of 40 mass %), DISPERBYK-180 (with a molecular weight: 2000, acid value: 95 mgKOH/g, amine value: 95 mgKOH/g, and solid content of 100 mass %), and DISPERBYK-185 (with a molecular weight: 1500, amine value: 18 mgKOH/g, and solid content of 100 mass %), and the like as product names made by BYK-Chemie Japan which are styrene-based dispersing agents.

(Chelating Agent (d))

The liquid composition of the present invention contains a chelating agent (d) capable of forming a complex with the infrared absorbent (a) and having a molecular weight of 1,000 to 100,000, the formed complex exhibiting substantially no absorption with respect to light having a visible wavelength, the chelating agent being in a ratio of 1 to 13 parts by mass relative to 100 parts by mass of the infrared absorbent (a).

Here, the "exhibiting substantially no absorption" means that, for example, a liquid composition, to which the chelating agent (d) is added by 50 parts by mass relative to 100 parts by mass of the infrared absorbent (a), is used for forming a film on a substrate so that the infrared absorbent (a) is deposited on the substrate by an amount of 0.7 g/m$^2$, where a difference between a value of YI measured based on JIS K7105 (1981) relative to the obtained substrate with a coated film and YI measured only to the substrate is 2.0 or less.

The chelating agent (d) has an operation to suppress chelate bonding of the ultraviolet absorbent (b) to the particles of the infrared absorbent (a) by operating to the particles of the infrared absorbent (a) together with the dispersing agent (c). Specifically, the dispersing agent (c) and the chelating agent (d) are thought to inhibit the ultraviolet absorbent (b) from chelate bonding to the particles of the infrared absorbent (a) by adhering to surfaces of inorganic particles constituting the infrared absorbent (a).

Note that the chelating agent (d) in this description generally refers to compounds which are capable of coordinate bonding by one molecule to plural positions on the surfaces of particles of the infrared absorbent (a), have a small steric hinderance after adhering to the particles due to a molecular structure, and do not have the function to increase dispersion stability of the particles of the infrared absorbent (a).

Here, in the liquid composition of the present invention, the dispersing agent (c) is one having a portion which adheres to the surface of a particle of the infrared absorbent (a) and a portion which extends into the dispersion medium (to be a part of the liquid medium (f)) to secure dispersion stability, and is contained by an appropriate amount which secures dispersion stability of the particles of the infrared absorbent (a) in the liquid composition. Normally, such an appropriate amount of the dispersing agent (c) is not always enough to cover the surfaces of particles of the infrared absorbent (a) sufficiently and to be capable of suppressing the chelate bonding of the ultraviolet absorbent (b). Accordingly, in the present invention, by containing the chelating agent (d) in the liquid composition, the surfaces of particles of the infrared absorbent (a) can be sufficiently covered together with the dispersing agent (c), and the chelate bonding of the ultraviolet absorbent (b) to the infrared absorbent (a) particles can be suppressed sufficiently.

The chelating agent (d) used in the present invention is a chelating agent capable of forming a complex with the infrared absorbent (a), the formed complex exhibits substantially no absorption with respect to light having a visible wavelength, and a molecular weight of the chelating agent is 1,000 to 100,000. The molecular weight is preferably 1,500 to 100,000, more preferably 2,000 to 100,000. With the molecular weight of the chelating agent (d) being in the above range, even when an amount by which the chelate bonding of the ultraviolet absorbent (b) to the particles of the infrared absorbent (a) can be suppressed sufficiently by adhering and coordinating onto the surfaces of the infrared absorbent (a) particles together with the dispersing agent (c), specifically 1 to 13 parts by mass relative to 100 parts by mass of the infrared absorbent (a), is used, the chelating agent (d) does not bleed out from the coating film after the coating film is formed, adhering points do not decrease relative to molecules, and moreover, hardness of the coating film does not decrease.

The content of the chelating agent (d) in the liquid composition is in a ratio of 1 to 13 parts by mass relative to 100 parts by mass of the infrared absorbent (a), and is adjusted appropriately within the above range corresponding to the content of the dispersing agent (c). The above content of the chelating agent (d) is an amount that, when the chelating agent (d) having the above molecular weight is used together with the dispersing agent (c), does not cause bleedout of the chelating agent (d) from the coating film after film formation, while sufficiently suppressing the chelate bonding of the ultraviolet absorbent (b) to the particles of the infrared absorbent (a) in the liquid composition.

The chelating agent (d) may be contained in the dispersion liquid containing the particles of the infrared absorbent (a), the dispersing agent (c), and the dispersion medium (to be a part of the liquid medium (f)). However, from the point of efficiently suppressing the chelate bonding of the infrared absorbent (a) and the ultraviolet absorbent (b), preferably, the chelating agent is contained in a solution in which the ultraviolet absorbent (b) and the binder component (e) are solved in the liquid medium (f), the solution being normally prepared separately from the dispersion liquid when the composition of the present invention is produced.

The chelating agent (d) is selected appropriately corresponding to the type of the binder component (e) in the liquid composition and the type of the liquid medium (f) which is normally used according to this binder component (e). For example, since the liquid composition contains water and alcohol when the binder component (e) is mainly constituted of the material component for forming silicon oxide-based matrix, the chelating agent (d) soluble to these polar solvents is preferred.

As such a chelating agent (d), specifically, a polymer in the above range of molecular weight obtained by using one or more monomers selected from a maleic acid, an acrylic acid, and a methacrylic acid, or the like may be mentioned. The polymer may be a homopolymer or a copolymer. In the present invention, preferably, a polymaleic acid and a polyacrylic acid are used. They may be used alone or two or more of them may be used in combination.

In the present invention, commercially available products can be used as the chelating agent (d). As the commercially available products, for example, there may be mentioned NONPOL PMA-50W (product name, made by NOF Corporation, aqueous solution with a molecular weight: 1,200, solid content of 40 to 48 mass %), or the like as the polymaleic acid, and AQUALIC HL (product name, made by Nippon Shokubai Co., Ltd, aqueous solution with a molecular weight: 10,000, solid content of 45.5 mass %), or the like as the polyacrylic acid.

(Binder Component (e))

The binder component (e) contained in the liquid composition of the present invention is a material component for forming a coating film. The binder component (e) is not particularly limited as long as it is a material component for forming a coating film, which can constitute a liquid composition by using the liquid medium (f) as will be described below together with the above content (a) to content (d).

Specifically, as the coating film formed on a substrate, such as glass plate, a film constituted of a thermoplastic resin, a film constituted of a cured product of a curable resin, a silicon oxide-based film by a sol-gel method, and the like may be mentioned. As the binder component (e), there may be mentioned a thermoplastic resin, a curable resin, a material component for forming silicon oxide-based matrix, and the like which are generally used for forming them. Among them, in the present invention, preferably, a material component for forming silicon oxide-based matrix is used as the binder component (e). Note that these resins and material components can be used alone, or two or more of them can be used in combination.

As the thermoplastic resin, for example, a thermoplastic acrylic resin such as a polymethyl methacrylate may be mentioned.

Further, as the curable resin, a resin cured by heat or light such as ultraviolet (UV) may be mentioned. As the resin cured by heat, for example, a crosslink-curable acrylic resin, a crosslink-curable silicone resin, a phenol resin, a melamine resin, an epoxy resin, and the like may be mentioned. As the ultraviolet (UV) curable resin, a UV curable acrylic resin and a UV curable epoxy resin, and the like may be mentioned. Such a curable resin is cured by heat or light to form a coating film on the substrate.

As the binder component (e) used in the present invention, more preferably, the binder component (e) mainly constituted of a material component for forming silicon oxide-based matrix forming a silicon oxide-based matrix film by sol-gel method is used. Here, when the amine value of the dispersing agent is high, it is possible that a pot life of the liquid composition becomes short. Thus, when the binder component (e) mainly constituted of a material component for forming silicon oxide-based matrix is used, preferably, the dispersing agent (c) having a low amine value is used.

Here, in this description, the "silicon oxide-based matrix" by a sol-gel method refers to a high molecular compound which is linearly or three-dimensionally polymerized by siloxane bonding represented by —Si—O—Si—, which is obtained by hydrolytic (co-)condensation of hydrolyzable silicon compounds. That is, the material component of the silicon oxide-based matrix is constituted of at least one selected from hydrolyzable silicon compounds. Note that when the hydrolyzable silicon compounds are subjected to hydrolytic (co-)condensation in order to obtain the silicon oxide-based matrix, water and acid catalyst or the like are necessary, but in this description they are treated as separate components from the material components of the silicon oxide-based matrix and the binder component (e).

Further, in this description, the "hydrolyzable silicon compounds" are used as a generic term for a group of silane compounds in which at least one hydrolyzable group is bonded to a silicon atom, and for a partially hydrolyzed (co-)condensate of one or more of such a group of silane compounds. Further, the number of functionalities, such as tetrafunctional, trifunctional, and bifunctional, of a hydrolyzable silicon compound hereinafter refers to the number of hydrolyzable groups bonded to a silicon atom in the compounds of the group of silane compounds. Further, the partially hydrolyzed (co-)condensates may be a compound having a hydrolyzable group and a silanol group (hydroxyl group coupled to a silicon atom), or may be a compound having only a silanol group.

In this description, as necessary, the term of partially hydrolyzed (co-)condensate is used to generally refer to partially hydrolyzed condensates and partially hydrolyzed co-condensates as necessary.

The hydrolyzable silicon compounds as the binder component (e) contained in the liquid composition of the present invention are preferably at least partially constituted of a partially hydrolyzed (co-)condensate rather than constituted only of a compound (for example, tetraalkoxysilane) of the group of silane compounds, in aspects of stability and uniform reactivity of the hydrolyzable silicon compounds in the liquid composition. Accordingly, preferably, the partially hydrolyzed condensate is used as a material of the liquid composition, or the compound of the group of silane compounds is used as a material and at least part of the compound is subjected to partially hydrolytic condensation when the liquid composition is produced. For example, preferably, a tetraalkoxysilane is used, the tetraalkoxysilane, a reaction catalyst thereof, and other components constituting the liquid composition are mixed, and thereafter a process of subjecting at least part of the tetraalkoxysilane in this mixture to hydrolytic condensation (specifically, for example, a process of stirring for a predetermined time under room temperature or while heated) is carried out, to thereby prepare the liquid composition.

When two or more compounds (for example, a tetrafunctional hydrolyzable silicon compound and a trifunctional hydrolyzable silicon compound) of the group of silane compounds are used, by subjecting them to hydrolytic co-condensation in advance to produce a partially hydrolyzed co-condensate, a uniform coating film can be obtained easily when the coating film is formed from the liquid composition. Further, also when the silylated ultraviolet absorbent is used, by similarly subjecting to hydrolytic co-condensation with other hydrolyzable silicon compounds in advance, the ultraviolet absorbent can be dispersed more evenly in the silicon oxide-based matrix.

In the present invention, the material component for the silicon oxide-based matrix preferably contains at least one tetrafunctional hydrolyzable silicon compound (or a partially hydrolyzed (co-)condensate thereof). In this case, the liquid composition preferably further contains a flexibility-imparting component, which will be described later, as the binder component (e). The material component for forming silicon oxide-based matrix is also preferably one containing at least one each of the tetrafunctional hydrolyzable silicon compound and the trifunctional hydrolyzable silicon compound (or a partially hydrolyzed condensate of each of them or a partially hydrolyzed co-condensate of them).

In a particularly preferred embodiment related to the material component for forming silicon oxide-based matrix, the hydrolyzable silicon compounds are constituted only of at least one tetrafunctional hydrolyzable silicon compound (or a partially hydrolyzed (co-)condensate thereof) and contained as the binder component (e) together with the flexibility-imparting component in the liquid composition, or constituted of at least one each of the tetrafunctional hydrolyzable silicon compound and the trifunctional hydrolyzable silicon compound (or a partially hydrolyzed condensate of each of them or a partially hydrolyzed co-condensate of them) and contained as the binder component (e) together with the flexibility-imparting component as necessary in the liquid composition.

As the hydrolyzable group which the hydrolyzable silicon compound has, specifically, there may be mentioned an alkoxy group (including a substituted alkoxy group such as an alkoxy-substituted alkoxy group), an alkenyloxy group, an acyl group, an acyloxy group, an oxime group, an amide group, an amino group, an iminoxy group, an aminoxy group, an alkyl-substituted amino group, an isocyanate group, a chlorine atom, or the like. Among them, as the hydrolyzable group, an organooxy group such as an alkoxy group, an alkenyloxy group, an acyloxy group, an iminoxy group, or an aminoxy group is preferred, and an alkoxy group is particularly preferred. As the alkoxy group, an alkoxy group having 4 or less carbon atoms and an alkoxy-substituted alkoxy group having 4 or less carbon atoms (such as a 2-methoxyethoxy group) are preferred, and a methoxy group and an ethoxy group are particularly preferred.

The tetrafunctional hydrolyzable silicon compound as the compound of the group of silane compounds is a compound in which four hydrolyzable groups are bonded to a silicon atom. The four hydrolyzable groups may be the same as or different from each other. The hydrolyzable groups are preferably an alkoxy group, more preferably an alkoxy group having 4 or less carbon atoms, furthermore preferably a methoxy group and an ethoxy group. Specifically, a tetramethoxysilane, a tetraethoxysilane, a tetra-n-propoxysilane, a tetra-n-butoxysilane, a tetra-sec-butoxysilane, a tetra-tert-butoxysilane, and the like may be mentioned. In the present invention, preferably, a tetraethoxysilane, a tetramethoxysilane, and the like are used. They may be used alone or two or more of them may be used in combination.

The trifunctional hydrolyzable silicon compound as the compound of the group of silane compounds is a compound in which three hydrolyzable groups and one non-hydrolyzable group are bonded to a silicon atom. The three hydrolyzable groups may be the same as or different from each other. The hydrolyzable groups are preferably an alkoxy group, more preferably an alkoxy group having 4 or less carbon atoms, more preferably a methoxy group or an ethoxy group.

The non-hydrolyzable group is preferably a non-hydrolyzable monovalent organic group having a functional group or having no functional group, more preferably a non-hydrolyzable monovalent organic group having a functional group. The non-hydrolyzable monovalent organic group refers to an organic group in which this organic group and a silicon atom are bonded with a carbon-silicon bond, and a bond terminal atom is a carbon atom.

Here, the functional group used in this description is a term comprehensively indicating a group having reactivity, which is distinguished from a mere substituent group, and this term does not include, for example, a non-reactive group such as a saturated hydrocarbon group. Further, an addition-polymerizable unsaturated double bond (ethylenic double bond) not related to formation of a main chain of a high-molecular compound, such as one which a monomer has in its side chain, is assumed as one type of functional groups. Further, the term "(meth)acrylic . . . " such as a (meth)acrylic ester used in this description means both "acrylic . . . " and "methacrylic . . . ".

Among the above non-hydrolyzable monovalent organic groups, the non-hydrolyzable monovalent organic group having no functional group is preferably a hydrocarbon group having no addition-polymerizable unsaturated double bond such as an alkyl group or an aryl group, or a halogenated hydrocarbon group having no addition-polymerizable unsaturated double bond such as a halogenated alkyl group. The number of carbon atoms the non-hydrolyzable monovalent organic group having no functional group has is preferably 20 or less, more preferably 10 or less. This monovalent organic group is preferably an alkyl group having 4 or less carbon atoms.

As the bifunctional hydrolyzable silicon compound having a non-hydrolyzable monovalent organic group having no functional group, specifically, there may be mentioned methyltrimethoxysilane, methyltriethoxysilane, methyltris(2-methoxyethoxy)silane, methyltriacetoxysilane, methyltripropoxysilane, methyltriisopropenoxysilane, methyltributoxysilane, ethyltrimethoxysilane, ethyltriethoxysilane, phenyltrimethoxysilane, phenyltriethoxysilane, phenyltriacetoxysilane, and the like. They may be used alone or two or more of them may be used in combination.

As the functional group in the non-hydrolyzable monovalent organic group having a functional group, there may be mentioned an epoxy group, a (meth)acryloxy group, a primary or secondary amino group, an oxetanyl group, a vinyl group, a styryl group, a ureido group, a mercapto group, an isocyanate group, a cyano group, a halogen atom, and the like, and an epoxy group, a (meth)acryloxy group, a primary or secondary amino group, an oxetanyl group, a vinyl group, a ureido group, a mercapto group, and the like are preferred. In particular, an epoxy group, a primary or secondary amino group, and a (meth)acryloxy group are preferred. The monovalent organic group having an epoxy group is preferably a monovalent organic group having a glycidoxy group or a 3,4-epoxycyclohexyl group, and the organic group having a primary or secondary amino group is preferably a monovalent organic group having an amino group, a monoalkylamino group, a phenylamino group, an N-(aminoalkyl)amino group, or the like.

There may exist two or more functional groups in the monovalent organic group, but excluding the case of a primary or secondary amino group, a monovalent organic group having one functional group is preferred. In the case of a primary or secondary amino group, it may have two or more amino groups, and in this case, a monovalent organic group having one primary amino group and one secondary amino group, for example, an N-(2-aminoethyl)-3-aminopropyl group and 3-ureidopropyl group is preferred. The total number of carbon atoms these monovalent organic groups having a functional group have is preferably 20 or less, more preferably 10 or less.

As the trifunctional hydrolyzable silicon compound having a non-hydrolyzable monovalent organic group having a functional group, specifically, the following compounds may be mentioned.

Vinyltrimethoxysilane, vinyltriethoxysilane, vinyltriacetoxysilane, vinyltris(2-methoxyethoxy)silane, vinyltriisopropenoxysilane, p-styryltrimethoxysilane, 3-glycidoxypropyltrimethoxysilane, 3-glycidoxypropyltriethoxysilane, 5,6-epoxyhexyltrimethoxysilane, 9,10-epoxydecyltrimethoxysilane, 2-(3,4-epoxycyclohexyl)ethyltrimethoxysilane, 2-(3,4-epoxycyclohexyl)ethyltriethoxysilane, N-(2-aminoethyl)-3-aminopropyltrimethoxysilane, N-(2-aminoethyl)-3-aminopropyltriethoxysilane, 3-aminopropyltrimethoxysilane, 3-aminopropyltriethoxysilane, 3-ureidopropyltriethoxysilane, 3-methacryloxypropyltrimethoxysilane, 3-methacryloxypropyltriethoxysilane, 3-acryloxypropyltrimethoxysilane, di-(3-methacryloxy)propyltriethoxysilane, 3-isocyanatepropyltriethoxysilane, 3-chloropropyltrimethoxysilane, 3-chloropropyltriethoxysilane, 3-chloropropyltripropoxysilane, 3,3,3-trifluoropropyltrimethoxysilane, 3-mercaptopropyltrimethoxysilane, 3-mercaptopropyltriethoxysilane, 2-cyanoethyltrimethoxysilane, and the like may be mentioned.

A preferred compound among them is a trifunctional hydrolyzable silicon compound in which one monovalent organic group having at a terminal of an alkyl group having 2 or 3 carbon atoms, a functional group of one of a glycidoxy group, a 3,4-epoxycyclohexyl group, an amino group, an alkylamino group (number of carbon atoms the alkyl group has is 4 or less), a phenylamino group, an N-(aminoalkyl) amino group (number of carbon atoms the alkyl group has is 4 or less), and a (meth)acryloxy group, and three alkoxy groups having 4 or less carbon atoms are bonded to a silicon atom.

As such a compound, specifically, 3-glycidoxypropyltrimethoxysilane, 3-glycidoxypropyltriethoxysilane, 2-(3,4-epoxycyclohexyl)ethyltrimethoxysilane, 2-(3,4-epoxycyclohexyl)ethyltriethoxysilane, 3-methacryloxypropyltrimethoxysilane, di-(3-methacryloxy)propyltriethoxysilane, and the like may be mentioned. In view of the reactivity with the silane compound, 3-glycidoxypropyltrimethoxysilane, 3-glycidoxypropyltriethoxysilane, 2-(3,4-epoxycyclohexyl)ethyltrimethoxysilane or 2-(3,4-epoxycyclohexyl)ethyltriethoxysilane, and the like are particularly preferred. They may be used alone or two or more of them may be used in combination.

The material component for forming silicon oxide-based matrix may contain a bifunctional hydrolyzable silicon compound as necessary. The bifunctional hydrolyzable silicon compound is a compound in which two hydrolyzable groups and two non-hydrolyzable groups are bonded to a silicon atom. The two hydrolyzable groups may be the same or different from each other. The hydrolyzable group is preferably an alkoxy group, more preferably an alkoxy group having 4 or less carbon atoms, furthermore preferably a methoxy group or an ethoxy group.

The non-hydrolyzable group is preferably a non-hydrolyzable monovalent organic group. The non-hydrolyzable monovalent organic group may have the same functional group as that of the trifunctional hydrolyzable silicon compound as necessary.

As the bifunctional hydrolyzable silicon compound, specifically, there may be mentioned dimethyldimethoxysilane, dimethyldiethoxysilane, dimethyldi(2-methoxyethoxy)silane, dimethyldiacetoxysilane, dimethyldipropoxysilane, dimethyldiisopropenoxysilane, dimethyldibutoxysilane, vinylmethyldimethoxysilane, vinylmethyldiethoxysilane, vinylmethyldiacetoxysilane, vinylmethyldi(2-methoxyethoxy)silane, vinylmethyldiisopropenoxysilane, phenylmethyldimethoxysilane, phenylmethyldiethoxysilane, phenylmethyldiacetoxysilane, 3-chloropropylmethyldimethoxysilane, 3-chloropropylmethyldiethoxysilane, 3-chloropropylmethyldipropoxysilane, 3,3,3-trifluoropropylmethyldimethoxysilane, 3-methacryloxypropylmethyldimethoxysilane, 3-acryloxypropylmethyldimethoxysilane, 3-aminopropylmethyldimethoxysilane, 3-aminopropylmethyldiethoxysilane, 3-mercaptopropylmethyldimethoxysilane, 3-mercaptopropylmethyldiethoxysilane, N-(2-aminoethyl)-3-aminopropylmethyldimethoxysilane, 2-cyanoethylmethyldimethoxysilane, and the like. They may be used alone or two or more of them may be used in combination.

Further, in the material component for forming silicon oxide-based matrix, the tetrafunctional hydrolyzable silicon compound, the trifunctional hydrolyzable silicon compound, and the bifunctional hydrolyzable silicon compound may be contained in the liquid composition as they are, or may each be contained as a partially hydrolyzed condensate, or may be contained as a partially hydrolyzed co-condensate of two or more of them.

The partially hydrolyzed (co-)condensate is an origomer (multimer) produced by hydrolysis of the hydrolyzable silicon compound and then dehydration condensation thereof. The partially hydrolyzed (co-)condensate is generally a high molecular weight body of a degree that dissolves in a solvent. The partially hydrolyzed (co-)condensate has a hydrolyzable group or a silanol group, and has a nature to undergo further hydrolytic (co-)condensation to become a final cured product. Only from one type of hydrolyzable silicon compound, the partially hydrolyzed condensate can be obtained, or from two or more types of hydrolyzable silicon compounds, the partially hydrolyzed co-condensate as their co-condensate can be obtained.

The partially hydrolytic (co-)condensation of the hydrolyzable silicon compound can be performed, for example, by stirring a reaction liquid obtained by adding water to a lower alcohol solution of the hydrolyzable silicon compound at 10° C. to 40° C. for 1 to 48 hours under existence of an acid catalyst. Note that as the acid catalyst used for the reaction, specifically, there may be exemplified inorganic acids such as nitric acid, hydrochloric acid, sulfuric acid, or phosphoric acid, carboxylic acids such as formic acid, acetic acid, propionic acid, glycolic acid, oxalic acid, malonic acid, succinic acid, maleic acid, phthalic acid, citric acid, or malic acid, or sulfonic acids such as methanesulfonic acid, and the like can be exemplified. The addition amount of the acid can be set without any particular limitation within a range that the function as a catalyst can be exhibited, and specifically, an amount of about 3.0 to 0.001 mole/L may be mentioned as the amount relative to the volume of the reaction solution containing the hydrolyzable silicon compound, and the like.

Note that the tetrafunctional hydrolyzable silicon compound, the trifunctional hydrolyzable silicon compound, and the bifunctional hydrolyzable silicon compound are distinguished from each other as units which finally constitute the silicon oxide-based matrix, regardless of which of the above states they are contained in the liquid composition. Hereinafter, in the binder component (e), for example, the tetrafunctional hydrolyzable silicon compound itself, its partially hydrolyzed condensate, and a component derived from the hydrolyzable silicon compound in the partially hydrolyzed co-condensate will together be referred to as a component derived from the tetrafunctional hydrolyzable silicon compound.

The hydrolyzable silicon compounds in the material component for forming silicon oxide-based matrix is, as described above, preferably (1) constituted only of a component derived from the tetrafunctional hydrolyzable silicon compound, or (2) constituted of a component derived from the tetrafunctional hydrolyzable silicon compound and a component derived from the trifunctional hydrolyzable silicon compound. Note that in the case of (1), the liquid composition preferably further contains a flexibility-imparting component as the binder component (e) in order to acquire sufficient crack resistance while securing a certain film thickness of a coating film obtained by using the liquid composition. Further, in the case of (2), the content ratio of the component derived from the tetrafunctional hydrolyzable silicon compound and the component derived from the trifunctional hydrolyzable silicon compound is preferably 30/70 to 95/5, more preferably 40/60 to 90/10, particularly preferably 50/50 to 85/25 in a mass ratio as the component derived from the tetrafunctional hydrolyzable silicon compound/the component derived from the trifunctional hydrolyzable silicon compound.

Further, the component derived from the bifunctional hydrolyzable silicon compound is used optionally as necessary in (1) or (2). Its content is preferably 30 mass % or less by mass % relative to the total amount of the hydrolyzable silicon compounds.

In the liquid composition of the present invention, when the binder component (e) is mainly constituted of the material component for forming silicon oxide-based matrix, the hydrolyzable silicon compounds contained therein are subjected to hydrolytic co-condensation and dried, to thereby form a coating film. This reaction is generally carried out under existence of an acid catalyst and water, similarly to the partially hydrolytic (co-)condensation of the hydrolyzable silicon compound. Therefore, the liquid composition contains an acid catalyst and water. Both the type and the content of the acid catalyst to be used can be the same as those in the case of the partially hydrolytic (co-)condensation.

The amount of water contained in the liquid composition for carrying out the hydrolytic (co-)condensation of the hydrolyzable silicon compounds is not particularly limited as long as it is a sufficient amount for subjecting the hydrolyzable silicon compounds to the hydrolytic (co-)condensation, but is preferably 1 to 20 equivalent amount, more preferably 4 to 18 equivalent amount, in a mole ratio to an amount converted into $SiO_2$ of the hydrolyzable silicon compounds contained in the material component for forming silicon oxide-based matrix. When the amount of water is less than 1 equivalent amount in the mole ratio, the hydrolysis is difficult to proceed, and the liquid composition may be repelled when it is applied depending on the substrate or a haze may increase, and when the amount exceeds more than 20 equivalent amount, the hydrolysis rate increases, and a long term storage property may become insufficient.

When the binder component (e) is mainly constituted of the material component for forming silicon oxide-based matrix, as described above, it is possible and preferred that the flexibility-imparting component which imparts flexibility to the silicon oxide-based matrix be contained optionally in the liquid composition as part of the binder component (e). By containing the flexibility-imparting component, it can contribute to preventing occurrence of crack in the coating film obtained from the liquid composition. Note that the binder component (e) being mainly constituted of the material component for forming silicon oxide-based matrix means that the ratio of the material component for forming silicon oxide-based matrix relative to the total content of the binder component (e) is 50 mass % or more.

Note that although blending of the flexibility-imparting component is effective regardless of what constitution the material component for forming silicon oxide-based matrix has, particularly the silicon oxide-based matrix constituted only of the tetrafunctional hydrolyzable silicon compound may be insufficiently flexible, and when the liquid composition contains the tetrafunctional hydrolyzable silicon compound and the flexibility-imparting component, a coating film excellent in both mechanical strength and crack resistance can be produced easily.

As the flexibility-imparting component, for example, there may be mentioned various organic resins such as a silicone resin, an acrylic resin, a polyester resin, a polyurethane resin, a hydrophilic organic resin containing a polyoxyalkylene group, and an epoxy resin, and organic compounds such as glycerin.

When the organic resin is used as the flexibility-imparting component, its mode is preferably liquid, particle, or the like. The organic resin may also be a curable resin which is crosslinked and cured during curing, drying, or the like of the material component for forming silicon oxide-based matrix. In this case, within a range not impairing the characteristics of the silicon oxide-based matrix, part of the material component for forming silicon oxide-based matrix and the curable resin as the flexibility-imparting component may partially be reacted and crosslinked.

As the silicone resin among the flexibility-imparting components, preferably, a silicone oil including various modified silicone oils, a silicone rubber in which a diorganosilicone with a terminal containing a hydrolyzable silyl group or an organic group containing a polymerizable group is partially or entirely crosslinked, or the like may be mentioned.

As the hydrophilic organic resin containing a polyoxyalkylene group, preferably, polyethylene glycol (PEG), a polyether phosphate polymer, and the like may be mentioned.

As the polyurethane resin, a polyurethane rubber or the like may be preferably mentioned, and as the acrylic resin, an acrylonitrile rubber, a homopolymer of an acrylic acid alkyl ester, a homopolymer of a methacrylic acid alkyl ester, a copolymer of an acrylic acid alkyl ester with a monomer copolymerizable with the acrylic acid alkyl ester, a copolymer of a methacrylic acid alkyl ester with a monomer copolymerizable with the methacrylic acid alkyl ester, and the like may be preferably mentioned. As the monomer copolymerizable with the (meth)acrylic acid alkyl ester, it is possible to use a hydroxyalkyl ester of (meth)acrylic acid, a (meth)acrylic acid ester having a polyoxyalkylene group, a (meth)acrylic acid ester having a partial structure of the ultraviolet absorbent, a (meth)acrylic acid ester having a silicon atom, and the like.

When the epoxy resin is used as the flexibility-imparting component, preferably, there may be used polyepoxides and a curing agent in combination, or polyepoxides alone. Polyepoxides are a general term for compounds having plural epoxy groups. That is, an average number of epoxy groups of polyepoxides is 2 or more, and in the present invention, polyepoxides in which an average number of epoxy groups is 2 to 10 are preferred.

As such polyepoxides, polyglycidyl compounds such as a polyglycidyl ether compound, a polyglycidyl ester compound, and a polyglycidyl amine compound are preferred. Further, the polyepoxides may be either aliphatic polyepoxides or aromatic polyepoxides, and aliphatic polyepoxides are preferred.

Among them, a polyglycidyl ether compound is preferred, and an aliphatic polyglycidyl ether compound is particularly preferred. The polyglycidyl ether compound is preferably a glycidyl ether of an alcohol having two or more functional groups, and is particularly preferably a glycidyl ether of an alcohol having three or more functional groups because light resistance can be improved. Note that such an alcohol is preferably an aliphatic alcohol, an alicyclic alcohol, or a sugar alcohol.

Specifically, an ethylene glycol diglycidyl ether, a polyethylene glycol diglycidyl ether, a propylene glycol diglycidyl ether, a polypropylene glycol diglycidyl ether, a neopentyl glycol diglycidyl ether, a glycerol polyglycidyl ether, a diglycerol polyglycidyl ether, a polyglycerol polyglycidyl ether, a trimethylolpropane polyglycidyl ether, a sorbitol polyglycidyl ether, a pentaerythritol polyglycidyl ether, and the like may be mentioned. Only one of them may be used, or two or more of them may be used in combination.

Among them, a polyglycidyl ether of an aliphatic polyol having three or more hydroxyl groups (one in which an average number of glycidyl groups (epoxy groups) per one molecule exceeds 2), such as a glycerol polyglycidyl ether, a diglycerol polyglycidyl ether, a polyglycerol polyglycidyl ether, and a sorbitol polyglycidyl ether, is particularly preferred because the light resistance can be improved further. They may be used alone or two or more of them may be used in combination.

In the present invention, among the flexibility-imparting components, an epoxy resin, particularly polyepoxides, PEG, glycerin, and the like are preferred because sufficient flexibility can be imparted to the coating film to be obtained while the mechanical strength is maintained. Further, the epoxy resin, particularly polyepoxides, PEG, glycerin, and the like have, in addition to a function to prevent the occurrence of crack caused by light irradiation for a long period, a function to prevent a decrease in the infrared absorptivity and the ultraviolet absorptivity while securing colorless transparency of the coating film to be obtained, to thereby improve the light resistance. Note that in the present invention, among them, the polyepoxides are particularly preferred.

The content of the flexibility-imparting component in the liquid composition is not particularly limited as long as it is an amount capable of imparting flexibility to the coating film to be obtained and improving the crack resistance without impairing the effects of the present invention. The content of it is preferably 0.1 to 20 parts by mass, more preferably 1.0 to 20 parts by mass relative to 100 parts by mass of the material component for forming silicon oxide-based matrix.

In the liquid composition of the present invention, the content of the binder component (e) is preferably 3 to 30 mass %, more preferably 5 to 20 mass % relative to the amount of the total solid content in the liquid composition.

Here, in this description, the total solid content refers to a coating film forming component among components contained in the liquid composition, and indicates all the components other than volatile components which evaporates due to heating or the like in a coating film forming process of the liquid medium (f) or the like.

Further, when the binder component (e) is mainly constituted of the material component for forming silicon oxide-based matrix in the liquid composition of the present invention, the content of the material component for forming silicon oxide-based matrix in the liquid composition is preferably 1 to 20 mass %, more preferably 3 to 15 mass % as an $SiO_2$ content when silicon atoms contained in the material component for forming silicon oxide-based matrix are converted into $SiO_2$, relative to the total content of the liquid composition. When the content of the material component for forming silicon oxide-based matrix relative to the total content of this liquid composition is less than 1 mass % as an amount converted into $SiO_2$, it is necessary to increase the application amount of the liquid composition for obtaining a coating film having a desired film thickness, and consequently an exterior appearance may be deteriorated. When the content exceeds 20 mass %, the film thickness in a state that the liquid composition is applied becomes thick, and a crack may occur in the coating film to be obtained.

(Liquid Medium (f)

The liquid composition of the present invention is prepared in the form such that predetermined amounts of the infrared absorbent (a), the ultraviolet absorbent (b), the dispersing agent (c), the chelating agent (d), and the binder component (e) which are necessary components, and optional amounts of various optionally contained additives and the like, which will be described later, are further dissolved and dispersed in the liquid medium (f). The total solid content in the liquid composition needs to be stably dissolved or dispersed in the liquid medium (f).

The liquid medium (f) means a dispersion medium in which solid particles of the infrared absorbent (a) and the like are dispersed and a solvent in which the ultraviolet absorbent (b), the binder component (e), and the like are dissolved, and refers to a compound having a relatively low boiling point and being liquid at room temperature. The liquid medium (f) is constituted of an organic compound such as an alcohol and an inorganic compound such as water, and may be a mixture of two or more types. Further, the dispersion medium and the solvent may be the same liquid medium or may be different liquid media. In the case where the dispersion medium and the solvent are different, the liquid medium (f) in the liquid composition is a mixture of the dispersion medium and the solvent.

When the liquid composition of the present invention is produced by mixing one or more dispersion liquids in which solid particles of the infrared absorbent (a) and the like are dispersed and one or more solutions in which the ultraviolet absorbent (b), the binder component (e) and the like are dissolved, the dispersion medium in the dispersion solution to be used and the solvent in the solution are compatible with each other, and generally the liquid medium (f) in the obtained liquid composition needs to be a uniform mixture. As described above, generally, the dispersing agent (c) is contained in the dispersion liquid in which solid particles of the infrared absorbent (a) and the like are dispersed, and the chelating agent (d) is contained in the dispersion liquid in which the ultraviolet absorbent (b), the binder component (e), and the like are dissolved. Therefore, on the dispersion medium in the dispersion liquid to be used, there are fewer restrictions on a dissolving ability for other components other than a dissolving ability for the dispersing agent (c). Thus preferably, a solvent having the dissolving ability for the dispersing agent (c) is selected, and this solvent is used as the dispersion medium or a liquid medium compatible with this solvent is used as the dispersion medium.

In other words, the liquid medium (f) contained in the liquid composition is not particularly limited as long as it is a solvent capable of stably dissolving mainly the binder component (e) and the ultraviolet absorbent (b). As described above, as the chelating agent (d), one that can be dissolved in such a solvent is selected appropriately within the range of the present invention. Further, depending on the solvent selected here, a dispersing agent (c) containing a high molecular chain compatible with this solvent as a constituent part is selected appropriately within the range of the present invention, a dispersion liquid of the particles of the infrared absorbent (a) is produced by using this solvent together with this dispersing agent, and the particles of the infrared absorbent (a) can be dispersed stably in the liquid composition by using this dispersion liquid.

The binder component (e), the ultraviolet absorbent (b), and the chelating agent (d) may be prepared as separate solutions to be used for production of the liquid composition, or two or three of them may be used in one solution. Further, in a dispersion liquid of the particles of the infrared absorbent (a), it is also possible to dissolve the binder component (e), the ultraviolet absorbent (b), and/or the chelating agent (d). Preferably, a dispersion liquid of the particles of the infrared absorbent (a) containing the dispersing agent (c), a solution of the ultraviolet absorbent (b), a solution of the binder component (e), and a solution of the chelating agent (d) are mixed to produce the liquid composition of the present invention. Further, optional components used appropriately other than the necessary components thereof may each be prepared as a dispersion liquid or a solution, and the dispersion liquid or the solution may be used. Alternatively, they may be blended in the dispersion liquid of the infrared absorbent (a) or the solutions of the ultraviolet absorbent (b), the binder component (e), the chelating agent (d), and the like and used. When the blended components are thus provided in the state of a solution or a dispersion liquid, the solvent or dispersion medium may be used as it is without being removed, thereby constituting part of the liquid medium (f) in the liquid composition.

As the liquid medium (f), specifically, there may be mentioned ketones such as acetone, methyl ethyl ketone, methyl isobutyl ketone, and cyclohexanone; ethers such as tetrahydrofuran, 1,4-dioxane, and 1,2-dimethoxyethane; esters such as ethyl acetate, butyl acetate, and methoxyethyl acetate; alcohols such as methanol, ethanol, 1-propanol, 2-propanol, 1-butanol, 2-butanol, 2-methyl-1-propanol, 2-methoxyethanol, 4-methyl-2-pentanol, 2-butoxyethanol, 1-methoxy-2-propanol, and diacetone alcohol; hydrocarbons such as n-hexane, n-heptane, isooctane, benzene, toluene, xylene, gasoline, light oil, and kerosene; acetonitrile, nitromethane, water, and the like.

They may be used alone or two or more of them may be used in combination. Moreover, the amount of the liquid medium (f) to be used is adjusted appropriately depending on the types and blending ratios of the necessary component (a) to component (e), and the like.

Here, when the binder component (e) is mainly constituted of the material component for forming silicon oxide-based matrix in the liquid composition of the present invention, in order to obtain a state that the respective components contained in the liquid composition are stably dissolved or dispersed, the liquid medium (f) contains at least 20 mass % or more, preferably 50 mass % or more of alcohol. As such an alcohol to be used in the liquid medium (f), methanol, ethanol, 1-propanol, 2-propanol, 1-butanol, 2-butanol, 2-methyl-1-propanol, 1-methoxy-2-propanol, 2-ethoxyethanol, 4-methyl-2-pentanol, and 2-butoxyethanol, and the like, are preferred, and among them, an alcohol having a boiling point of 80° C. to 160° C. is preferred in view of good solubility of the material component for forming silicon oxide-based matrix and a good coating property on the substrate. Specifically, ethanol, 1-propanol, 2-propanol, 1-butanol, 2-butanol, 2-methyl-1-propanol, 1-methoxy-2-propanol, 2-ethoxyethanol, 4-methyl-2-pentanol, and 2-butoxyethanol are preferred.

Further, when containing a solvent used in the process of producing the binder component (e) or a byproduct, for example, the partially hydrolyzed (co-)condensate of the hydrolyzable silicon compound, the liquid medium (f) to be used in the liquid composition may contain a lower alcohol or the like generated accompanying hydrolysis of the material hydrolyzable silicon compound (for example, silanes having an alkoky group) in the production process thereof and an alcohol or the like used as a solvent as they are.

Moreover, when the binder component (e) is mainly constituted of the material component for forming silicon oxide-based matrix, in the liquid composition, as a liquid medium (f) other than the above ones, another liquid medium (f) miscible with water and alcohol and different from the alcohol may be used in combination. As such a liquid medium (f), ketones such as acetone and acetylacetone; esters such as ethyl acetate and isobutyl acetate; ethers such as propylene glycol monomethyl ether, dipropylene glycol monomethyl ether, diisopropyl ether, and the like may be mentioned.

The amount of the liquid medium (0 contained in the liquid composition is preferably an amount that makes the total solid content concentration in the liquid composition be 3.5 to 50 mass %, more preferably 9 to 30 mass %. Having the amount of the liquid medium (f) in the liquid composition within the above range results in good workability.

(Liquid Composition)

The liquid composition of the present invention contains the component (a) to component (f) which are necessary components by contents appropriately adjusted within the above ranges. The liquid composition of the present invention can further contain various optional compounding agents as necessary within a range not impairing the effects of the present invention. For example, the liquid composition of the present invention may contain additives such a defoaming agent and a viscosity-adjusting agent for the purpose of improving the coating property to the substrate, and may contain additives such as an adhesion-imparting agent for the purpose of improving the adhesion to the substrate. The contents of these additives are preferably an amount such that each additive component is 0.01 to 2 parts by mass relative to 100 parts by mass of the binder component (e) in the liquid composition. Further, the liquid composition of the present invention may contain a dye, a pigment, a filler, or the like within a range not impairing the object of the present invention.

Further, when the liquid composition of the present invention contains the hydrolyzable silicon compound itself as the material component for forming silicon oxide-based matrix, in order to stabilize the liquid composition during storage or the like, a treatment to subject them to partially hydrolytic (co-)condensation may be carried out. Preferably, this partially hydrolytic (co-)condensation is performed under existence of an acid catalyst similarly to the above and under reaction conditions similar to the above. Generally, after one or more single hydrolyzable silicon compounds are mixed as necessary, stirring is performed at room temperature for a predetermined time under existence of an acid catalyst, and thereby the object can be achieved.

(Preferred Combination of Compositions)

For the liquid composition of the present invention, compositions, specifically types of components and content ratios thereof, are preferably selected appropriately according to applications and required characteristics. Preferred compositions for the liquid composition of the present invention will be described below.

<Composition 1>

1 to 80 parts by mass of a tin-doped indium oxide as the infrared absorbent (a), 1 to 50 parts by mass of a hydroxylated benzophenone-based compound as the ultraviolet absorbent (b), 5 to 15 parts by mass of the dispersing agent (c) relative to 100 parts by mass of the tin-doped indium oxide, the dispersing agent having a molecular weight of 1,000 to 100,000, 1 to 13 parts by mass of a chelating agent as the chelating agent (d) relative to 100 parts by mass of the tin-doped indium oxide, the chelating agent being capable of forming a complex with the tin-doped indium oxide and having a molecular weight of 1,000 to 100,000, the formed complex exhibiting substantially no absorption with respect to light having a visible wavelength, 100 parts by mass of a binder component mainly constituted of a material component for forming silicon oxide-based matrix as the binder component (e), and the liquid medium (f) by an amount that makes the total solid content concentration in the liquid composition be 3.5 to 50 mass %.

<Composition 2>

1 to 80 parts by mass of a tin-doped indium oxide as the infrared absorbent (a), 1 to 50 parts by mass of a hydroxylated benzophenone-based compound as the ultraviolet absorbent (b), 5 to 15 parts by mass of the dispersing agent (c) relative to 100 parts by mass of the tin-doped indium oxide, the dispersing agent having a molecular weight of 1,000 to 100,000, 1 to 13 parts by mass of a polymer as the chelating agent (d) relative to 100 parts by mass of the tin-doped indium oxide, the polymer being obtainable as being constituted of one or more monomers selected from a maleic acid, an acrylic acid, and a methacrylic acid and having a molecular weight of 1,000 to 100,000, 100 parts by mass of a binder component mainly constituted of a material component for forming silicon oxide-based matrix as the binder component (e) and containing polyepoxides by an amount of 0.1 to 20 parts by mass relative to 100 parts by mass of the material component for forming silicon oxide-based matrix, and the liquid medium (f) by an amount that makes the total solid content concentration in the liquid composition be 3.5 to 50 mass %.

(Method for Producing the Liquid Composition)

Hereinafter, a method for manufacturing the liquid composition of the present invention will be described. The liquid composition of the present invention can be produced basically by a method including step (1) and step (2) below.

Step (1): a dispersion liquid preparation step of mixing the infrared absorbent (a), the dispersing agent (c), and the dispersion medium (equivalent to part or whole of the liquid medium (f) to obtain a dispersion liquid.

Step (2): a mixing step of mixing the dispersion liquid obtained in step (1), the ultraviolet absorbent (b), the chelating agent (d), the binder component (e), and a residue of the liquid medium (f) when part of the liquid medium (f) is used as the dispersion medium in step (1).

(1) Dispersion Liquid Preparation Step (Step (1))

When the liquid composition of the present invention is produced, in this step (1), the infrared absorbent (a), the dispersing agent (c), and the dispersion medium are mixed.

Regarding the infrared absorbent (a) and the dispersing agent (c), types, preferred modes, and so on are as described above.

Further, the blending ratios of the infrared absorbent (a) and the dispersing agent (c) used for this mixing are the same ratios as those described above.

Here, the dispersion medium used in step (1) is equivalent to part or whole of the liquid medium (f), and specifically, water and/or organic solvent may be mentioned. Note that the organic solvent mentioned here means a liquid medium constituted of an organic compound, and does not mean a solvent capable of dissolving the infrared absorbent (a). The selection of a high molecular chain of the dispersing agent (c) is appropriately made according to the type of the binder component (e) mainly used in the liquid composition of the present invention and the type of the solvent selected according to the binder component (e). The dispersion medium is similarly selected appropriately according to the types of the binder component (e) and the solvent. As the dispersion medium, one compatible at least with the solvent selected according to the type of the binder component (e) or preferably the same one as this is used.

As the organic solvent usable as the dispersion medium, specifically, there may be mentioned alcohols such as methanol, ethanol, n-propanol, isopropanol, n-butanol, ethylene glycol, diethylene glycol, triethylene glycol, propylene glycol, and glycerin; aromatic hydrocarbons such as toluene and xylene; ketones such as acetone, methyl ethyl ketone, and methyl isobutyl ketone; esters such as methyl acetate, ethyl acetate, propyl acetate, butyl acetate, and isobutyl acetate; ethers such as tetrahydrofuran, dioxane, ethylene glycol monomethyl ether (methyl cellosolve), ethylene glycol monoethyl ether (ethyl cellosolve), and ethylene glycol monobutyl ether (butyl cellosolve), an aliphatic hydrocarbon such as hexane, and an alicyclic hydrocarbon such as cyclohexane.

The amount of the dispersion medium to be used is preferably an amount that makes the content of the infrared absorbent (a) in the dispersion liquid to be obtained be 0.9 to 90 mass %, more preferably 15 to 50 mass % of the whole dispersion liquid from the viewpoint that workability is good and a good dispersibility can be obtained.

As a method for preparing the dispersion liquid from the respective components in step (1), conventional publicly known mixing and stirring methods can be used. For example, a method to weight predetermined amounts of the predetermined components, and then mix and stir them with a bead mill, a ball mill, a nanomizer, or the like may be mentioned.

(2) Mixing Step

There are mixed the dispersion liquid obtained in above step (1), predetermined amounts of the ultraviolet absorbent (b), the chelating agent (d), and the binder component (e) and, in the case where part of the liquid medium (f) is used instead of the whole of the liquid medium (f) in step (1), the residue of the liquid medium (f) excluding the part used as the dispersion medium in step (1).

Note that in step (2), when the ultraviolet absorbent (b), the chelating agent (d), and the binder component (e) are mixed in the dispersion liquid obtained in step (1), it is not always necessary to simultaneously add the ultraviolet absorbent (b), the chelating agent (d), and the binder component (e) to mix them. The ultraviolet absorbent (b), the chelating agent (d), and the binder component (e) may be sequentially added to the dispersion liquid to mix them, and any two components out of these three components may be combined and added separately from the remaining one component. Also, the order of adding these components (d) to (e) is not particularly limited.

When the whole liquid medium (f) is used in preparation of the dispersion liquid in step (1), the ultraviolet absorbent (b), the chelating agent (d), and the binder component (e) themselves are mixed together with the dispersion liquid obtained in step (1). When part of the liquid medium (f) is used in preparation of the dispersion liquid in step (1), the ultraviolet absorbent (b), the chelating agent (d), and the binder component (e) may be added to the dispersion liquid in the state of solution by using the residue of the liquid medium (f). In this case, the liquid medium (f) contained in the liquid composition to be obtained finally becomes one combining the dispersion medium derived from the dispersion liquid, and the solvents of solutions of the respective components, and the liquid medium added alone.

The components blended in the dispersion liquid are all the components other than the components contained in the dispersion liquid in the liquid composition. Regarding these components, both the types and the contents in the liquid composition are as described above. The method of mixing is not particularly limited as long as it can mix them evenly. Specifically, a mixing method by using a magnetic stirrer or the like may be mentioned.

The liquid composition for forming a coating film of the present invention is thus obtained. The liquid composition of the present invention enables to form a coating film which secures colorless transparency and is further excellent in weather resistance, and in which occurrence of bleedout is suppressed, even though it sufficiently has the ultraviolet absorbing function and the infrared absorbing function. The liquid composition for forming a coating film of the present invention is used by applying it to form a film on a surface of the substrate on which a coating film is to be formed. The material of the substrate to which the liquid composition for forming a coating film of the present invention is applied is not limited in particular, and basically a transparent glass, a resin, and the like may be mentioned.

When the substrate is a glass, an ordinary soda lime glass, a borosilicate glass, a non-alkali glass, a quartz glass or the like may be mentioned as the material. As the glass substrate, it is also possible to use a glass substrate which absorbs ultraviolet rays and/or infrared rays. Further, when the substrate is a resin, an acrylic resin such as polymethyl methacrylate, an aromatic polycarbonate resin such as polyphenylene carbonate, or the like may be mentioned as the material.

When the mixing ratio of the infrared absorbent (a) in the coating film is high, the visible light transmittance of the coating film tends to be low, and thus the visible light transmittance of the substrate is preferably 70% or more, more preferably 74% or more as visible light transmittance measured in accordance with JIS 83212 (1998).

Note that in the present invention, a glass substrate is preferred among them from the viewpoint of weather resistance of the substrate and adhesion to the substrate. A glass article will be described below, which has a coating film formed on the glass substrate by using the liquid composition of the present invention.

[Glass Article of the Present Invention]

The glass article of the present invention has a glass substrate and a coating film formed on a surface of at least part of the glass substrate by using the liquid composition of the present invention.

In order to obtain the glass article of the present invention, as a specific method to form the coating film on the glass substrate by using the liquid composition of the present invention, there may be mentioned a method including (A) a step of applying the liquid composition on a glass substrate to form an applied film, and (B) a step of removing the liquid medium (f) from the obtained applied film, further performing a treatment corresponding to film forming conditions of the binder component (e) used, for example, a curing treatment for a curable resin, to form a coating film.

Note that in this description, a film constituted of the liquid composition of the present invention including the liquid medium (f) applied on the substrate is referred to as an "applied film", and a film in a state that the liquid medium (f) is removed from this applied film and the film formation is completely finished by performing the treatment corresponding to the binder component (e) used, such as curing, is referred to as a "coating film".

First, in step (A), the liquid composition is applied on the glass substrate to form an applied film of the liquid composition. Note that the applied film formed here contains the liquid medium (f). The method for applying the liquid composition to the glass substrate is not limited in particular as long as it is a method capable of applying evenly, and a publicly known method such as flow coating, dip coating, spin coating, spray coating, flexographic printing, screen printing, gravure printing, roll coating, meniscus coating, die coating, or the like can be used. The thickness of the applied film of the applied liquid is determined in consideration of the thickness of the coating film to be finally obtained.

For step (B) performed next, conditions are selected appropriately according to the binder component (e) used so as to carry out this step.

For example, in the case of the binder component (e) mainly constituted of the material component for forming silicon oxide-based matrix preferably used in the present invention, in above step (B), the liquid medium (f) is removed from the applied film of the liquid composition on the glass substrate, and the material component for forming silicon oxide-based matrix such as the hydrolyzable silicon compound is cured to form a coating film. The step (B) will be described below in the case of the liquid composition using the binder component (e) mainly constituted of the material component for forming silicon oxide-based matrix as the liquid composition of the present invention.

In this case, removal of the liquid medium (f) from the applied film in step (B) is preferably performed by heating and/or reduced pressure drying. After the applied film is formed on the glass substrate, temporary drying at a temperature from room temperature to about 120° C. is performed preferably from the viewpoint of improving a leveling property of the applied film. Normally during this operation of temporary drying, the liquid medium (f) is evaporated and removed in parallel therewith, and thus an operation of removing the liquid medium (f) is included in the temporary drying. The time for the temporary drying, that is, the time for the operation of removing the liquid medium (f) depends on the liquid composition used for forming a coating film and is preferably about 3 seconds to about 2 hours.

Note that at this time, the liquid medium (f) is preferably removed sufficiently, but need not be completely removed. That is, it is possible that part of the liquid medium (f) remains on the coating film within the range not affecting the performance of the coating film to be obtained finally. Further, when heating is performed for removing the liquid medium (f), heating for removing the liquid medium (f), that is, temporary heating in general and heating thereafter for producing the silicon oxide-based compound, which is performed as follows as necessary, may be performed sequentially.

After the liquid medium (f) is removed from the applied film as described above, the material component for forming silicon oxide-based matrix such as the hydrolyzable silicon compound is cured. This reaction can be performed at room temperature or while heating. When a cured product (silicon oxide-based matrix) is generated while heating, since the cured product contains organic components, the upper limit of the heating temperature is preferably 200° C., particularly preferably 190° C. Since the cured product can be formed at room temperature, the lower limit thereof is not particularly limited. However, when it is intended to accelerate the reaction by heating, the lower limit of the heating temperature is preferably 60° C., more preferably 80° C. Therefore, this heating temperature is preferably 60° C. to 200° C., more preferably 80° C. to 190° C. The heating time depends on the composition of the liquid composition to be used for forming a coating film, and is preferably several minutes to several hours.

The method for forming a coating film on the glass substrate has been described above by taking an example of the case of the liquid composition using the binder component (e) mainly composed of the material component for forming silicon oxide-based matrix as the liquid composition of the present invention. However, even when another curable resin, thermoplastic resin, or the like is used as the binder component (e), it is possible to form a coating film by using a publicly known method conventionally used for forming a coating film on the glass substrate by using these resins.

The coating film formed as described above by using the liquid composition of the present invention has excellent infrared absorptivity and ultraviolet absorptivity, securely has colorless transparency, and is further excellent in weather resistance. In the glass article of the present invention having the coating film, the film thickness of the coating film is preferably 1.0 μm to 7.0 μm, more preferably 1.5 μm to 5.5 μm. When the film thickness of the coating film is less than 1.0 μm, the effects of ultraviolet absorption and infrared absorption may become insufficient. Further, when the film thickness of the coating film exceeds 7.0 μm, a crack may occur.

Note that in the glass article of the present invention having the above coating film, specifically, the ultraviolet transmittance measured by using a spectrophotometer (U-4100 manufactured by Hitachi, Ltd.) is preferably 3.0% or less, more preferably 1.0% or less, particularly preferably 0.5% or less as ultraviolet transmittance measured in accordance with ISO-9050 (1990).

Further, the solar radiation transmittance is preferably 45.0% or less, more preferably 44.0% or less, particularly preferably 43.0% or less as solar radiation transmittance measured in accordance with JIS 83106 (1998).

Moreover, the visible light transmittance is preferably 50% or more, more preferably 70% or more, particularly preferably 74% or more as visible light transmittance measured in accordance with JIS 83212 (1998).

YI calculated according to HS K7105 (1981) is an index for yellowish color and is preferably 12 or less, more preferably 5 or less.

Thus, the glass article on which a coating film is formed by using the liquid composition of the present invention has excellent infrared absorptivity and ultraviolet absorptivity, securely has colorless transparency, and is further excellent in weather resistance, in which occurrence of bleedout is suppressed. Thus, it can be applied to a glass article for outdoor use, for example, a window glass for a vehicle such as an automobile, or window glass for a building material to be attached to an architecture such as a house or a building, and the like.

EXAMPLES

Hereinafter, the present invention will be described further by taking examples of the present invention, but the present invention is not limited to these examples. Note that examples 1 to 8 which will be described below are examples, and examples 9 to 18 are comparative examples.

<Details of Commercially Available Products (Product Names) used in Examples>

(Infrared Absorbent (a))

ITO ultrafine particles: made by Mitsubishi Materials Corporation (mean primary particle diameter 20 nm), hereinafter abbreviated as "ITO" as appropriate.

(Dispersing Agent (c))

DISPERBYK-190: made by BYK-Chemie Japan, 40 mass % aqueous solution of a dispersing agent having an acid value: 10 mgKOH/g and a molecular weight of 2200, hereinafter abbreviated as "BYK190" as appropriate.

DISPERBYK-194: made by BYK-Chemie Japan, 53 mass % aqueous solution of a dispersing agent having an acid value: 70 mgKOH/g and a molecular weight of 650, hereinafter abbreviated as "BYK194" as appropriate.

(Chelating Agent (d))

NONPOL PMA-50W: made by NOF Corporation, 44.0 mass % of an aqueous solution of a polymaleic acid having a molecular weight: 1,200, hereinafter abbreviated as "PMA-50W" as appropriate.

AQUALIC HL: made by Nippon Shokubai Co., Ltd, 45.5 mass % of an aqueous solution of a polyacrylic acid having a molecular weight: 10,000, hereinafter abbreviated as "HL" as appropriate.

CHELEST GA: made by CHELEST CORPORATION, dihydroxyethylglycine (aminocarboxylic acid-based chelating agent), molecular weight 163, hereinafter abbreviated as "GA" as appropriate.

CHELEST PH-210: made by CHELEST CORPORATION, 1-hydroxyethylidene-1,1-diphosphonic acid solution (phosphonic acid-based chelating agent), molecular weight 206, hereinafter abbreviated as "PH210" as appropriate.

CHELEST HA: made by CHELEST CORPORATION, HEDTA (Hydroxyethyl Ethylene Diamine Triacetic Acid)-based chelating agent) molecular weight 278, hereinafter abbreviated as "HA" as appropriate.

(Binder Component (e): Flexibility-Imparting Component)

SR-SEP: made by SAKAMOTO YAKUHIN KOGYO CO., LTD., sorbitol polyglycidyl ether (Liquid Medium (f))

SOLMIX AP-1: made by Japan Alcohol Trading Co., Ltd., a mixed solvent of ethanol: 2-propanol: methanol=85.5:13.4:1.1 (mass ratio)

<Preparation Example of Silylated Ultraviolet Absorbent Solution>

49.2 g of 2,2',4,4'-tetrahydroxybenzophenone (made by BASF), 123.2 g of 3-glycidoxypropyltrimethoxysilane (made by Shi-Etsu Chemical Co., Ltd.), 0.8 g of benzyltriethylammonium chloride (made by JUNSEI CHEMICAL CO., LTD.), and 100 g of butyl acetate (made by JUNSEI CHEMICAL CO., LTD.) were put together and heated to 60° C. while stirring, dissolved, and heated to 120° C. and subjected to reaction for 4 hours, to thereby obtain a silylated ultraviolet absorbent solution having a solid content concentration of 63 mass %.

<Preparation Example of ITO Dispersion Liquid A>

11.9 g of ITO ultrafine particles, 3.0 g of DISPERBYK-190, and 24.2 g of SOLMIX AP-1 were subjected to dispersion processing for 48 hours using a ball mill, SOLMIX AP-1 was further added thereafter to dilute it so that the ITO solid content concentration becomes 20 mass %, thereby obtaining an ITO dispersion liquid A.

<Preparation Example of ITO Dispersion Liquids B, C, D>

An ITO dispersion liquid B, an ITO dispersion liquid C, and an ITO dispersion liquid D were obtained similarly except that the addition amount of DISPERBYK-190 was changed to 3.6 g (ITO dispersion liquid B), 4.5 g (ITO dispersion liquid C), and 9.0 g (ITO dispersion liquid D) in preparation of the ITO dispersion liquid A.

<Preparation Example of ITO Dispersion Liquids E, F>

An ITO dispersion liquid E and an ITO dispersion liquid F were obtained similarly except that 3.0 g of DISPERBYK-190 was changed to 2.8 g of DISPERBYK-194 (ITO dispersion liquid E) and 4.8 g of DISPERBYK-194 (ITO dispersion liquid F) in preparation of the ITO dispersion liquid A.

The compositions of the obtained ITO dispersion liquids A to F are presented in Table 1.

TABLE 1

| | | Abbreviation of ITO dispersion liquid | | | | | |
|---|---|---|---|---|---|---|---|
| | | A | B | C | D | E | F |
| Infrared absorbent (a) | Type | ITO | ITO | ITO | ITO | ITO | ITO |
| | Addition amount (g) | 11.9 | 11.9 | 11.9 | 11.9 | 11.9 | 11.9 |
| | Concentration in dispersion liquid (wt %) | 20 | 20 | 20 | 20 | 20 | 20 |
| Dispersing agent (c) | Type | BYK190 | BYK190 | BYK190 | BYK190 | BYK194 | BYK194 |
| | Addition amount (g) | 3.0 | 3.6 | 4.5 | 9.0 | 2.8 | 4.8 |
| | Solid content (wt %) | 40.0 | 40.0 | 40.0 | 40.0 | 53.0 | 53.0 |
| | Parts by mass relative to ITO 100 parts by mass | 10.0 | 12.0 | 15.0 | 30.0 | 10.0 | 17.4 |
| | Acid value | 10 | 10 | 10 | 10 | 70 | 70 |

<Preparation Example of SR-SEP Solution>

SR-SEP was diluted with SOLMIX AP-1, thereby obtaining an SR-SEP solution with a solid content concentration of 30 mass %.

Example 1

7.0 g of ITO dispersion liquid A, 45.8 g of SOLMIX AP-1, 10.9 g of tetramethoxysilane, 11.7 g of silylated ultraviolet absorbent solution, 0.8 g of SR-SEP solution, 13.5 g of pure water, 10.3 g of acetic acid, and 0.20 g of NONPOL PMA-50W were put together and stirred for an hour, thereby obtaining a liquid composition 1. The composition of the obtained liquid composition 1 is presented in Table 2.

Thereafter, the liquid composition 1 was applied by spin coating on a high heat ray absorbing green glass (Tv: 74.8%, Tuv: 9.5%, Te: 48.0%, transmittance of light with a wavelength 380 nm: 38.5%, YI: 1.5, 10 cm length, 10 cm width, 3.5 mm thick, made by ASAHI GLASS COMPANY, LIMITED, commonly called UVFL) with a cleaned surface to form an applied film, and this applied film was dried and cured by a heat treatment at 180° C. for 30 minutes in the atmosphere, thereby obtaining a glass plate with an ultraviolet and infrared absorbing film.

Further, after the liquid composition 1 was prepared, it was stored for seven days in a thermostatic oven at 25° C., and thereafter a glass plate with an ultraviolet and infrared absorbing film was obtained by the same method. Properties of the obtained glass plates with an ultraviolet and infrared absorbing film were evaluated as follows. Evaluation results are presented in Table 2.

[Evaluation]
1) Film thickness: a film thickness [μm] of the ultraviolet and infrared absorbing film was measured by using a stylus type surface profile measuring instrument (ULVAC: Dektak 150).
2) Spectral property: measurement was performed by using a spectrophotometer (U-4100 made by Hitachi, Ltd.) to calculate visible light transmittance (Tv [%]) in accordance with JIS 83212 (1998), ultraviolet transmittance (Tuv [%]) in accordance with ISO-9050 (1990), and solar radiation transmittance (Te [%]) in accordance with JIS 83106 (1998), and to calculate YI in accordance with JIS K7105 (1981).
3) Bleedout: after the obtained glass plate with the ultraviolet and infrared absorbing film was allowed to stand for 100 hours under conditions of 50° C. temperature and 95% RH humidity, a state of occurrence of irregularities due to foreign objects on a coating film surface thereof was visually observed and evaluated with the following criteria.
○: No irregularity due to foreign objects was observed at all.
X: Irregularity due to foreign objects, even of a slight degree, was observed.
4) Accelerated weathering test (light resistance evaluation): the film thickness was adjusted so that the initial Tuv becomes 1.0. Specifically, the ultraviolet and infrared absorbing film obtained in Example 1 has a film thickness of 4.0 μm and Tuv of 0.3%, and thus the film thickness which makes the Tuv be 1.0 is 1.8 μm. Accordingly, the liquid composition 1 was used to form a film to have a film thickness of 1.8 μm, thereby obtaining a glass plate with an ultraviolet and infrared absorbing film. This glass plate with the ultraviolet and infrared absorbing film was placed in a super xenon weather meter (SX 75 made by Suga Test Instruments Co., Ltd.) set to conditions: irradiated illumination 150 W/m² (300 nm to 400 nm), black panel temperature 83° C., and humidity 50% RH, and an accelerated weathering test for allowing to stand until 1000 hours elapse was performed. After this test, the spectral properties were measured, and a difference in Tuv [%] before and after the test was obtained as ΔTuv [%].

Example 2

A liquid composition 2 was produced similarly to Example 1 except that the ITO dispersion liquid A was changed to ITO dispersion liquid B. Moreover, a glass plate with an ultraviolet and infrared absorbing film was produced similarly to Example 1 immediately after the liquid composition 2 was produced and after the liquid composition 2 was stored for seven days in a thermostatic oven at 25° C. Properties of the obtained glass plates with an ultraviolet and infrared absorbing film were evaluated similarly to Example 1. The composition of the liquid composition 2 and evaluation results of the glass plates with an ultraviolet and infrared absorbing film are presented in Table 2.

Example 3

A liquid composition 3 was produced similarly to Example 1 except that the ITO dispersion liquid A was changed to ITO dispersion liquid C. Moreover, a glass plate with an ultraviolet and infrared absorbing film was produced similarly to Example 1 immediately after the liquid composition 3 was produced and after the liquid composition 3 was stored for seven days in a thermostatic oven at 25° C. Properties of the obtained glass plates with an ultraviolet and infrared absorbing film were evaluated similarly to Example 1. The composition of the liquid composition 3 and evaluation results of the glass plates with an ultraviolet and infrared absorbing film are presented in Table 2.

Example 4

7.0 g of ITO dispersion liquid A, 44.7 g of SOLMIX AP-1, 11.2 g of tetramethoxysilane, 11.7 g of silylated ultraviolet absorbent solution, 0.7 g of SR-SEP solution, 14.2 g of pure water, 10.6 g of acetic acid, and 0.1 g of AQUALIC HL were put together and stirred for an hour, thereby obtaining a liquid composition 4. Moreover, a glass plate with an ultraviolet and infrared absorbing film was produced similarly to Example 1 immediately after the liquid composition 4 was produced and after the liquid composition 4 was stored for seven days in a thermostatic oven at 25° C. Properties of the obtained glass plates with an ultraviolet and infrared absorbing film were evaluated similarly to Example 1. The composition of the liquid composition 4 and evaluation results of the glass plates with an ultraviolet and infrared absorbing film are presented in Table 2.

Example 5

A liquid composition 5 was produced similarly to Example 4 except that the ITO dispersion liquid A was changed to ITO dispersion liquid B. Moreover, a glass plate with an ultraviolet and infrared absorbing film was produced similarly to Example 1 immediately after the liquid composition 5 was produced and after the liquid composition 5 was stored for seven days in a thermostatic oven at 25° C. Properties of the obtained glass plates with an ultraviolet and infrared absorbing film were evaluated similarly to Example 1. The composition of the liquid composition 5 and evaluation results of the glass plates with an ultraviolet and infrared absorbing film are presented in Table 2.

Example 6

A liquid composition 6 was produced similarly to Example 4 except that the ITO dispersion liquid A was changed to ITO dispersion liquid C. Moreover, a glass plate with an ultraviolet and infrared absorbing film was produced similarly to Example 1 immediately after the liquid composition 6 was produced and after the liquid composition 6 was stored for seven days in a thermostatic oven at 25° C. Properties of the obtained glass plates with an ultraviolet and infrared absorbing film were evaluated similarly to Example 1. The composition of the liquid composition 6 and evaluation results of the glass plates with an ultraviolet and infrared absorbing film are presented in Table 2.

Example 7

7.0 g of ITO dispersion liquid A, 46.1 g of SOLMIX AP-1, 10.9 g of tetramethoxysilane, 11.7 g of silylated ultraviolet absorbent solution, 0.8 g of SR-SEP solution, 13.5 g of pure water, 10.3 g of acetic acid, and 0.26 g of NONPOL PMA-50W were put together and stirred for an hour, thereby obtaining a liquid composition 7. Moreover, a glass plate with an ultraviolet and infrared absorbing film was produced similarly to Example 1 immediately after the liquid composition 7 was produced and after the liquid composition 7 was stored for seven days in a thermostatic oven at 25° C. Properties of the obtained glass plates with an ultraviolet and infrared absorbing film were evaluated similarly to Example 1. The composition of the liquid composition 7 and evaluation results of the glass plates with an ultraviolet and infrared absorbing film are presented in Table 2.

Example 8

7.0 g of ITO dispersion liquid A, 46.1 g of SOLMIX AP-1, 10.9 g of tetramethoxysilane, 11.7 g of silylated ultraviolet absorbent solution, 0.7 g of SR-SEP solution, 13.5 g of pure water, 10.3 g of acetic acid, and 0.32 g of NONPOL PMA-50W were put together and stirred for an hour, thereby obtaining a liquid composition 8. Moreover, a glass plate with an ultraviolet and infrared absorbing film was produced similarly to Example 1 immediately after the liquid composition 8 was produced and after the liquid composition 8 was stored for seven days in a thermostatic oven at 25° C. Properties of the obtained glass plates with an ultraviolet and infrared absorbing film were evaluated similarly to Example 1. The composition of the liquid composition 8 and evaluation results of the glass plates with an ultraviolet and infrared absorbing film are presented in Table 2.

Example 9

7.0 g of ITO dispersion liquid A, 46.1 g of SOLMIX AP-1, 10.9 g of tetramethoxysilane, 11.7 g of silylated ultraviolet absorbent solution, 0.7 g of SR-SEP solution, 13.4 g of pure water, 10.3 g of acetic acid, and 0.48 g of NONPOL PMA-50W were put together and stirred for an hour, thereby obtaining a liquid composition 9. Moreover, a glass plate with an ultraviolet and infrared absorbing film was produced similarly to Example 1 immediately after the liquid composition 9 was produced and after the liquid composition 9 was stored for seven days in a thermostatic oven at 25° C. Properties of the obtained glass plates with an ultraviolet and infrared absorbing film were evaluated similarly to Example 1. The composition of the liquid composition 9 and evaluation results of the glass plates with an ultraviolet and infrared absorbing film are presented in Table 3.

Example 10

A liquid composition 10 was produced similarly to Example 1 except that the ITO dispersion liquid A was changed to ITO dispersion liquid E. Moreover, a glass plate with an ultraviolet and infrared absorbing film was produced similarly to Example 1 immediately after the liquid composition 10 was produced and after the liquid composition 10 was stored for seven days in a thermostatic oven at 25° C. Properties of the obtained glass plates with an ultraviolet and infrared absorbing film were evaluated similarly to Example 1. The composition of the liquid composition 10 and evaluation results of the glass plates with an ultraviolet and infrared absorbing film are presented in Table 3.

Example 11

A liquid composition 11 was produced similarly to Example 4 except that the ITO dispersion liquid A was changed to ITO dispersion liquid E. Moreover, a glass plate with an ultraviolet and infrared absorbing film was produced similarly to Example 1 immediately after the liquid composition 11 was produced and after the liquid composition 11 was stored for seven days in a thermostatic oven at 25° C. Properties of the obtained glass plates with an ultraviolet and infrared absorbing film were evaluated similarly to Example 1. The composition of the liquid composition 11 and evaluation results of the glass plates with an ultraviolet and infrared absorbing film are presented in Table 3.

Example 12

9.3 g of ITO dispersion liquid F and 7.4 g of a CHELEST GA aqueous solution (having a solid content concentration of 10 mass %) were put together and stirred for 10 minutes, and thereafter 33.0 g of SOLMIX AP-1, 11.7 g of tetramethoxysilane, 10.4 g of silylated ultraviolet absorbent solution, 3.1 g of SR-SEP solution, 14.1 g of pure water, and 11.0 g of acetic acid were put together and stirred for an hour, thereby obtaining a liquid composition 12. Moreover, a glass plate with an ultraviolet and infrared absorbing film was produced similarly to Example 1 immediately after the liquid composition 12 was produced and after the liquid composition 12 was stored for seven days in a thermostatic oven at 25° C. Properties of the obtained glass plates with an ultraviolet and infrared absorbing film were evaluated similarly to Example 1. The composition of the liquid composition 12 and evaluation results of the glass plates with an ultraviolet and infrared absorbing film are presented in Table 3.

Example 13

9.3 g of ITO dispersion liquid F and 0.15 g of CHELEST PH-210 were put together and stirred for 10 minutes, and thereafter 36.2 g of SOLMIX AP-1, 10.7 g of tetramethoxysilane, 10.5 g of silylated ultraviolet absorbent solution, 4.2 g of SR-SEP solution, 18.9 g of pure water, and 10.1 g of acetic acid were put together and stirred for an hour, thereby obtaining a liquid composition 13. Moreover, a glass plate with an ultraviolet and infrared absorbing film was produced similarly to Example 1 immediately after the liquid composition 13 was produced and after the liquid composition 13 was stored for seven days in a thermostatic oven at 25° C. Properties of the obtained glass plates with an ultraviolet and infrared absorbing film were evaluated similarly to Example 1. The composition of the liquid composition 13 and evaluation results of the glass plates with an ultraviolet and infrared absorbing film are presented in Table 3.

Example 14

9.3 g of ITO dispersion liquid A and 0.37 g of CHELEST HA were put together and stirred for 10 minutes, and thereafter 45.8 g of SOLMIX AP-1, 10.7 g of tetramethoxysilane, 10.5 g of silylated ultraviolet absorbent solution, 1.2 g of SR-SEP solution, 12.0 g of pure water, and 10.1 g of acetic acid were put together and stirred for an hour, thereby obtaining a liquid composition 14. Moreover, a glass plate with an ultraviolet and infrared absorbing film was produced similarly to Example 1 immediately after the liquid composition 14 was produced and after the liquid composition 14 was stored for seven days in a thermostatic oven at 25° C. Properties of the obtained glass plates with an ultraviolet and infrared absorbing film were evaluated similarly to Example 1. The composition of the liquid composition 14 and evaluation results of the glass plates with an ultraviolet and infrared absorbing film are presented in Table 3.

Example 15

9.3 g of ITO dispersion liquid F, 33.8 g of SOLMIX AP-1, 11.7 g of tetramethoxysilane, 10.4 g of silylated ultraviolet absorbent solution, 3.1 g of SR-SEP solution, 20.7 g of pure water, and 11.0 g of acetic acid were put together and stirred for an hour, thereby obtaining a liquid composition 15. Moreover, a glass plate with an ultraviolet and infrared absorbing film was produced similarly to Example 1 immediately after the liquid composition 15 was produced and after the liquid composition 15 was stored for seven days in a thermostatic oven at 25° C. Properties of the obtained glass plates with an ultraviolet and infrared absorbing film were evaluated similarly to Example 1. The composition of the liquid composition 15 and evaluation results of the glass plates with an ultraviolet and infrared absorbing film are presented in Table 3.

Example 16

A liquid composition 16 was produced similarly to Example 15 except that the ITO dispersion liquid F was changed to ITO dispersion liquid D. Moreover, a glass plate with an ultraviolet and infrared absorbing film was produced similarly to Example 1 immediately after the liquid composition 16 was produced and after the liquid composition 16 was stored for seven days in a thermostatic oven at 25° C. Properties of the obtained glass plates with an ultraviolet and infrared absorbing film were evaluated similarly to Example 1. The composition of the liquid composition 16 and evaluation results of the glass plates with an ultraviolet and infrared absorbing film are presented in Table 3.

Example 17

7.0 g of ITO dispersion liquid A, 45.8 g of SOLMIX AP-1, 10.9 g of tetramethoxysilane, 11.7 g of silylated ultraviolet absorbent solution, 0.9 g of SR-SEP solution, 13.7 g of pure water, and 10.3 g of acetic acid were put together and stirred for an hour, thereby obtaining a liquid composition 17. Moreover, a glass plate with an ultraviolet and infrared absorbing film was produced similarly to Example 1 immediately after the liquid composition 17 was produced and after the liquid composition 17 was stored for seven days in a thermostatic oven at 25° C. Properties of the obtained glass plates with an ultraviolet and infrared absorbing film were evaluated similarly to Example 1. The composition of the liquid composition 17 and evaluation results of the glass plates with an ultraviolet and infrared absorbing film are presented in Table 3.

Example 18

A liquid composition 18 was produced similarly to Example 17 except that the ITO dispersion liquid A was changed to ITO dispersion liquid E. Moreover, a glass plate with an ultraviolet and infrared absorbing film was produced similarly to Example 1 immediately after the liquid composition 18 was produced and after the liquid composition 18 was stored for seven days in a thermostatic oven at 25° C. Properties of the obtained glass plates with an ultraviolet and infrared absorbing film were evaluated similarly to Example 1. The composition of the liquid composition 18 and evaluation results of the glass plates with an ultraviolet and infrared absorbing film are presented in Table 3.

TABLE 2

| | | | Example 1 | Example 2 | Example 3 | Example 4 | Example 5 | Example 6 | Example 7 | Example 8 |
|---|---|---|---|---|---|---|---|---|---|---|
| Solid content amount and so on of liquid composition | | Liquid composition | 1 | 2 | 3 | 4 | 5 | 6 | 7 | 8 |
| | | ITO dispersion liquid | A | B | C | A | B | C | A | A |
| | Infrared absorbent (a) | Amount (parts by mass) relative to 100 parts by mass of binder component (e) | 8.2 | 8.2 | 8.2 | 8.1 | 8.1 | 8.1 | 8.2 | 8.2 |
| | Ultraviolet absorbent (b) | Amount (parts by mass) relative to 100 parts by mass of binder component (e) | 12.3 | 12.3 | 12.3 | 12.2 | 12.2 | 12.2 | 12.3 | 12.3 |
| | Dispersing agent (c) | Type | BYK190 | BYK190 | BYK190 | BYK190 | BYK190 | BYK190 | BYK190 | BYK190 |
| | | Weight average molecular weight | 2200 | 2200 | 2200 | 2200 | 2200 | 2200 | 2200 | 2200 |
| | | Amount (parts by mass) relative to 100 parts by mass of infrared absorbent (a) | 10.0 | 12.0 | 15.0 | 10.0 | 12.0 | 15.0 | 10.0 | 10.0 |

TABLE 2-continued

|  |  |  |  | Example 1 | Example 2 | Example 3 | Example 4 | Example 5 | Example 6 | Example 7 | Example 8 |
|---|---|---|---|---|---|---|---|---|---|---|---|
|  | Chelating agent (d) | Type | | PMA-50W | PMA-50W | PMA-50W | HL | HL | HL | PMA-50W | PMA-50W |
|  |  | Weight average molecular weight | | 1200 | 1200 | 1200 | 10000 | 10000 | 10000 | 1200 | 1200 |
|  |  | Amount (parts by mass) relative to 100 parts by mass of infrared absorbent (a) | | 6.3 | 6.3 | 6.3 | 1.6 | 1.6 | 1.6 | 8.0 | 12.0 |
| Evaluation | Film produced immediately after preparation | Initial performance | Film thickness [μm] | 4.0 | 3.9 | 4.0 | 3.9 | 4.0 | 3.9 | 4.0 | 4.0 |
|  |  |  | Tv [%] | 74.0 | 74.0 | 74.0 | 74.0 | 74.0 | 74.0 | 74.0 | 73.9 |
|  |  |  | Tuv [%] | 0.3 | 0.3 | 0.3 | 0.3 | 0.3 | 0.3 | 0.3 | 0.3 |
|  |  |  | Te [%] | 42.1 | 42.2 | 42.1 | 42.2 | 42.1 | 42.2 | 42.1 | 42.0 |
|  |  |  | YI | 3.1 | 3.3 | 3.5 | 3.3 | 3.5 | 3.7 | 3.2 | 3.1 |
|  |  |  | Bleedout | ○ | ○ | ○ | ○ | ○ | ○ | ○ | ○ |
|  |  | Weathering test | Film thickness [μm] | 1.9 | 1.8 | 1.9 | 1.9 | 1.8 | 1.9 | 1.9 | 1.8 |
|  |  |  | ΔTuv [%] | 1.5 | 2.0 | 1.7 | 1.8 | 1.5 | 2.0 | 1.7 | 1.8 |
|  | Film produced after storage for seven days | Initial performance | Film thickness [μm] | 4.0 | 3.9 | 4.0 | 3.9 | 4.0 | 3.9 | 4.0 | 4.0 |
|  |  |  | ΔTv [%] | 74.0 | 74.0 | 74.0 | 74.0 | 74.0 | 74.0 | 74.0 | 73.9 |
|  |  |  | ΔTuv [%] | 0.3 | 0.3 | 0.3 | 0.3 | 0.3 | 0.3 | 0.3 | 0.3 |
|  |  |  | YI | 3.2 | 3.5 | 3.7 | 3.6 | 3.7 | 3.9 | 3.5 | 3.2 |
|  |  |  | Bleedout | ○ | ○ | ○ | ○ | ○ | ○ | ○ | ○ |
|  |  | Weathering test | Film thickness [μm] | 1.9 | 1.8 | 1.9 | 1.9 | 1.8 | 1.9 | 1.9 | 1.8 |
|  |  |  | ΔTuv [%] | 1.5 | 2.0 | 1.7 | 1.8 | 1.5 | 2.0 | 1.7 | 1.8 |

TABLE 3

| | | | Example 9 | Example 10 | Example 11 | Example 12 | Example 13 | Example 14 | Example 15 | Example 16 | Example 17 | Example 18 |
|---|---|---|---|---|---|---|---|---|---|---|---|---|
| Solid content amount and so on of liquid composition | Liquid composition ITO dispersion liquid | | 9<br>A | 10<br>E | 11<br>E | 12<br>F | 13<br>F | 14<br>A | 15<br>F | 16<br>D | 17<br>A | 18<br>E |
| | Infrared absorbent (a) | Amount (parts by mass) relative to 100 parts by mass of binder component (e) | 8.2 | 8.2 | 8.2 | 11.0 | 11.4 | 8.2 | 11.0 | 11.0 | 8.2 | 8.2 |
| | Ultraviolet absorbent (b) | Amount (parts by mass) relative to 100 parts by mass of binder component (e) | 12.3 | 12.3 | 12.3 | 11.0 | 11.4 | 12.3 | 11.0 | 11.0 | 12.3 | 12.3 |
| | Dispersing agent (c) | Type | BYK190 | BYK194 | BYK194 | BYK194 | BYK194 | BYK190 | BYK194 | BYK190 | BYK190 | BYK194 |
| | | Weight average molecular weight | 2200 | 650 | 650 | 650 | 650 | 2200 | 650 | 2200 | 2200 | 650 |
| | | Amount (parts by mass) relative to 100 parts by mass of infrared absorbent (a) | 10.0 | 10.0 | 10.0 | 17.4 | 17.4 | 10.0 | 17.4 | 30.0 | 10.0 | 10.0 |
| | Chelating agent (d) | Type | PMA-50W | PMA-50W | HL | GA | PH210 | HA | — | — | — | — |
| | | Weight average molecular weight | 1200 | 1200 | 10000 | 163 | 206 | 278 | — | — | — | — |
| | | Amount (parts by mass) relative to 100 parts by mass of infrared absorbent (a) | 15.0 | 6.3 | 1.6 | 38.4 | 7.9 | 19.8 | — | — | — | — |

TABLE 3-continued

| | | | Example 9 | Example 10 | Example 11 | Example 12 | Example 13 | Example 14 | Example 15 | Example 16 | Example 17 | Example 18 |
|---|---|---|---|---|---|---|---|---|---|---|---|---|
| Evaluation | Film produced immediately after preparation | Initial performance | Film thickness [μm] | 4.0 | 4.0 | 4.0 | 4.0 | 4.0 | 4.0 | 3.9 | 4.0 | 4.0 | 3.9 |
| | | | Tv [%] | 74.0 | 74.0 | 73.9 | 74.0 | 73.9 | 74.1 | 74.0 | 74.1 | 74.1 | 74.0 |
| | | | Tuv [%] | 0.3 | 0.3 | 0.3 | 0.3 | 0.3 | 0.3 | 0.3 | 0.3 | 0.3 | 0.3 |
| | | | Te [%] | 42.1 | 42.1 | 42.0 | 42.1 | 42.0 | 42.1 | 42.2 | 42.1 | 42.1 | 42.2 |
| | | | YI | 3.1 | 3.8 | 3.6 | 3.7 | 3.1 | 3.1 | 4.9 | 4.9 | 5.5 | 5.1 |
| | | | Bleedout | x | ○ | ○ | x | x | ○ | ○ | x | ○ | ○ |
| | | Weathering test | Film thickness [μm] | 1.9 | 1.9 | 1.8 | 1.9 | 1.8 | 1.9 | 1.9 | 1.8 | 1.9 | 1.8 |
| | | | ΔTuv [%] | 1.7 | 2.4 | 2.3 | 2.5 | 2.5 | 2.2 | 3.8 | 3.7 | 4.0 | 5.0 |
| | Film produced after storage for seven days | Initial performance | Film thickness [μm] | 4.0 | 4.0 | 4.0 | 4.0 | 4.0 | 4.0 | 3.9 | 4.0 | 4.0 | 3.9 |
| | | | Tv [%] | 74.0 | 74.0 | 73.9 | 74.0 | 73.9 | 74.1 | 74.0 | 74.1 | 74.1 | 74.0 |
| | | | Tuv [%] | 0.3 | 0.3 | 0.3 | 0.3 | 0.3 | 0.3 | 0.3 | 0.3 | 0.3 | 0.3 |
| | | | YI | 3.2 | 4.2 | 4.3 | 5.2 | 4.2 | 3.2 | 6.5 | 6.7 | 7.8 | 6.6 |
| | | | Bleedout | x | x | x | x | x | x | x | x | ○ | ○ |
| | | Weathering test | Film thickness [μm] | 1.9 | 1.9 | 1.8 | 1.9 | 1.8 | 1.9 | 1.9 | 1.8 | 1.9 | 1.8 |
| | | | ΔTuv [%] | 1.7 | 3.0 | 3.5 | 4.0 | 2.5 | 2.2 | 7.0 | 6.8 | 7.5 | 6.6 |

As can be seen from Table 2, the glass articles on which a coating film was formed by using the liquid compositions of Example 1 to Example 8 as the liquid composition of the present invention have excellent infrared absorptivity and ultraviolet absorptivity, securely have colorless transparency in which no bleedout occurs, and are further excellent in weather resistance. The same can be said for the glass articles with a coating film obtained after the liquid compositions of Example 1 to Example 8 are stored for seven days. That is, the liquid composition of the present invention is excellent also in storage stability.

Note that the glass articles on which a coating film is formed by using the liquid compositions of Example 9 to Example 18 which are outside the range of the liquid composition of the present invention presented in Table 3, although excellent in infrared absorptivity and ultraviolet absorptivity, did not reach a sufficient level in any of colorless transparency, bleedout, weather resistance, and storage stability.

A glass article on which a coating film is formed by using a liquid composition of the present invention has excellent infrared absorptivity and ultraviolet absorptivity and securely has colorless transparency, in which occurrence of bleedout is suppressed, and which is further excellent in weather resistance. Thus, it can be applied to a glass article for outdoor use, for example, a window glass for a vehicle such as an automobile, or window glass for a building material to be attached to an architecture such as a house or a building, and the like.

What is claimed is:

1. A liquid composition for forming a coating film, the liquid composition comprising:
    an infrared absorbent (a) containing one or more oxides selected from the group consisting of a tin-doped indium oxide, an antimony-doped tin oxide, and a composite tungsten oxide;
    an ultraviolet absorbent (b) containing one or more compounds selected from the group consisting of a benzophenone-based compound, a triazine-based compound, and a benzotriazole-based compound;
    5 to 15 parts by mass of a dispersing agent (c) relative to 100 parts by mass of the infrared absorbent (a), the dispersing agent having a molecular weight of 1,000 to 100,000;
    1 to 13 parts by mass of a chelating agent (d) relative to 100 parts by mass of the infrared absorbent (a), the chelating agent being capable of forming a complex with the infrared absorbent (a) and having a molecular weight of 1,000 to 100,000, the formed complex exhibiting substantially no absorption with respect to light having a visible wavelength;
    a binder component (e); and
    a liquid medium (f).

2. The liquid composition according to claim 1, comprising the infrared absorbent (a) in a ratio of 1 to 80 parts by mass and the ultraviolet absorbent (b) in a ratio of 1 to 50 parts by mass, relative to 100 parts by mass of the binder component (e).

3. The liquid composition according to claim 1, comprising a hydroxylated benzophenone-based compound as the ultraviolet absorbent (b).

4. The liquid composition according to claim 1, comprising, as the ultraviolet absorbent (b), one or more compounds selected from the group consisting of a benzophenone-based compound, a triazine-based compound and a benzotriazole-based compound which comprise a silyl group having a hydrolyzable group.

5. The liquid composition according to claim 1, wherein the infrared absorbent (a) is a tin-doped indium oxide.

6. The liquid composition according to claim 1, wherein the chelating agent (d) is a polymer constituted of one or more monomers selected from the group consisting of a maleic acid, an acrylic acid, and a methacrylic acid.

7. The liquid composition according to claim 1, wherein the binder component (e) is mainly constituted of a material component for forming silicon oxide-based matrix.

8. The liquid composition according to claim 7, wherein the binder component (e) further contains polyepoxides.

9. A glass article, comprising a glass substrate and a coating film formed on a surface of at least a part of the glass substrate by using the liquid composition according to claim 1.

10. The glass article according to claim 9, wherein a film thickness of the coating film is 1.0 μm to 7.0 μm.

* * * * *